(12) United States Patent
Garthwaite

(10) Patent No.: US 7,031,990 B2
(45) Date of Patent: Apr. 18, 2006

(54) COMBINING EXTERNAL AND INTRAGENERATIONAL REFERENCE-PROCESSING IN A GARBAGE COLLECTOR BASED ON THE TRAIN ALGORITHM

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 491 days.

(21) Appl. No.: 10/313,254

(22) Filed: Dec. 6, 2002

(65) Prior Publication Data

US 2004/0111447 A1 Jun. 10, 2004

(51) Int. Cl.
*G06F 17/30* (2006.01)

(52) U.S. Cl. ..................................... 707/206
(58) Field of Classification Search ............... 707/206, 707/1–10, 100–104.1, 200–205; 711/159; 717/166

See application file for complete search history.

(56) References Cited

U.S. PATENT DOCUMENTS

| | | | |
|---|---|---|---|
| 4,724,521 A | 2/1988 | Carron, et al. |
| 4,797,810 A | 1/1989 | McEntee et al. |
| 4,912,629 A | 3/1990 | Shuler, Jr. |
| 4,989,134 A | 1/1991 | Shaw |
| 5,088,036 A | 2/1992 | Ellis et al. |
| 5,333,318 A | 7/1994 | Wolf |
| 5,392,432 A | 2/1995 | Engelstad et al. |
| 5,485,613 A | 1/1996 | Engelstad et al. |
| 5,560,003 A | 9/1996 | Nilsen et al. |
| 5,687,370 A | 11/1997 | Garst et al. |
| 5,801,943 A | 9/1998 | Nasburg |
| 5,845,276 A | 12/1998 | Emerson et al. |
| 5,845,298 A | 12/1998 | O'Connor et al. |
| 5,857,210 A | 1/1999 | Tremblay et al. |
| 5,873,104 A | 2/1999 | Tremblay et al. |
| 5,873,105 A | 2/1999 | Tremblay et al. |
| 5,900,001 A | 5/1999 | Wolczko et al. |
| 5,903,900 A | 5/1999 | Knippel et al. |
| 5,930,807 A | 7/1999 | Ebrahim et al. |
| 5,953,736 A | 9/1999 | O'Connor et al. |
| 5,960,087 A | 9/1999 | Tribble et al. |
| 5,999,974 A | 12/1999 | Ratcliff et al. |
| 6,021,415 A | 2/2000 | Cannon et al. |

(Continued)

FOREIGN PATENT DOCUMENTS

EP 0 904 055 9/1999

(Continued)

OTHER PUBLICATIONS

Jones and Lins, "Garbage Collection: Algorithms for Automatic Dynamic Memory Management," 1996, pp. 165-179, Wiley, New York.

(Continued)

*Primary Examiner*—Diane Mizrahi
(74) *Attorney, Agent, or Firm*—Kudirka & Jobse, LLP

(57) ABSTRACT

A garbage collector collects at least a generation of a dynamically allocated heap in increments. In each increment, it identifies references located outside a collection set that refer to objects that belong to the collection set, and it evacuates the objects thus referred to before it reclaims the memory space that the collection set occupies. In some collection increments, references to collection-set objects are located both inside and outside the generation. The collector locates all such references, both those inside the generation and those outside it, before it evacuates any objects in response to any of them. By doing so, it is able to reduce the cost of locating references and evacuating objects.

15 Claims, 26 Drawing Sheets

U.S. PATENT DOCUMENTS

| | | | |
|---|---|---|---|
| 6,047,125 | A | 4/2000 | Agesen et al. |
| 6,049,390 | A | 4/2000 | Notredame et al. |
| 6,049,810 | A | 4/2000 | Schwartz et al. |
| 6,065,020 | A | 5/2000 | Dussud |
| 6,081,665 | A * | 6/2000 | Nilsen et al. ............... 717/116 |
| 6,098,089 | A | 8/2000 | O'Connor et al. |
| 6,148,309 | A | 11/2000 | Azagury et al. |
| 6,148,310 | A | 11/2000 | Azagury et al. |
| 6,173,294 | B1 | 1/2001 | Azagury et al. |
| 6,185,581 | B1 | 2/2001 | Garthwaite |
| 6,226,653 | B1 | 5/2001 | Alpern et al. |
| 6,243,720 | B1 | 6/2001 | Munter et al. |
| 6,260,120 | B1 | 7/2001 | Blumenau et al. |
| 6,289,358 | B1 | 9/2001 | Mattis et al. |
| 6,308,185 | B1 | 10/2001 | Grarup et al. |
| 6,314,436 | B1 | 11/2001 | Houldsworth |
| 6,321,240 | B1 | 11/2001 | Chilimbi et al. |
| 6,353,838 | B1 | 3/2002 | Sauntry et al. |
| 6,381,738 | B1 | 4/2002 | Choi et al. |
| 6,393,439 | B1 | 5/2002 | Houldsworth et al. |
| 6,415,302 | B1 | 7/2002 | Garthwaite et al. |
| 6,424,977 | B1 | 7/2002 | Garthwaite |
| 6,434,576 | B1 | 8/2002 | Garthwaite |
| 6,434,577 | B1 | 8/2002 | Garthwaite |
| 6,442,661 | B1 | 8/2002 | Dreszer |
| 6,449,626 | B1 | 9/2002 | Garthwaite et al. |
| 6,496,871 | B1 | 12/2002 | Jagannathan et al. |
| 6,529,919 | B1 | 3/2003 | Agesen et al. |
| 6,567,905 | B1 | 5/2003 | Otis |
| 6,640,278 | B1 | 10/2003 | Nolan et al. |
| 6,757,890 | B1 | 6/2004 | Wallman |
| 6,769,004 | B1 | 7/2004 | Barrett |
| 6,820,101 | B1 | 11/2004 | Wallman |
| 6,826,583 | B1 | 11/2004 | Flood et al. |
| 6,868,488 | B1 | 3/2005 | Garthwaite |
| 6,892,212 | B1 | 5/2005 | Shuf et al. |
| 6,928,450 | B1 | 8/2005 | Nagarajan et al. |
| 6,931,423 | B1 | 8/2005 | Sexton et al. |
| 2002/0032719 | A1 | 3/2002 | Thomas, et al. |
| 2002/0095453 | A1 | 7/2002 | Steenngaard |
| 2002/0133533 | A1 | 9/2002 | Czajkowski et al. |
| 2002/0138506 | A1 | 9/2002 | Shuf, et al. |
| 2003/0088658 | A1 | 5/2003 | Davies et al. |
| 2003/0200392 | A1 | 10/2003 | Wright et al. |
| 2003/0217027 | A1 | 11/2003 | Farber, et al. |
| 2004/0010586 | A1 | 1/2004 | Burton, et al |
| 2004/0039759 | A1 | 2/2004 | Detlefs, et al. |
| 2004/0088338 | A1* | 5/2004 | Garthwaite ................. 707/206 |
| 2004/0111451 | A1* | 6/2004 | Garthwaite ................. 707/206 |
| 2004/0167947 | A1* | 8/2004 | Garthwaite ................. 707/206 |
| 2004/0215914 | A1 | 10/2004 | Dussud |

FOREIGN PATENT DOCUMENTS

| | | |
|---|---|---|
| EP | 0 969 377 | 1/2000 |
| WO | WO 0188713 | 11/2001 |

OTHER PUBLICATIONS

Paul Wilson, "Uniprocessor Garbage Collection Techniques," Technical Report, University of Texas, 1994.

Hudson and Moss, "Incremental Collection of Mature Objects," Proceedings of International Workshop on Memory Management, 1992, Springer-Verlag.

Grarup and Seligmann, "Incremental Mature Garbage Collection," M.Sc. Thesis, Available at http://www.daimi.au.dk/~jacobse/Papers/.

Seligmann and Grarup, "Incremental Mature Garbage Collection Using the Train Algorithm," Proceedings of ECOOP '95, Ninth European Conference on Object-Oriented Programming, 1995, http://www.daimi.au.dk/~jacobse/Papers/.

Clark and Mason, "Compacting Garbage Collection can be Fast and Simple," Software-Practice and Experience, Feb. 1996, pp. 177-194, vol. 26, No. 2.

Henry Baker, "List Processing in Real Time on a Serial Computer," Communications of the ACM 21, Apr. 4, 1978, pp. 280-294.

Appel, Ellis, and Li, "Real-time Concurrent Collection on Stock Multiprocessors," ACM SIGPLAN Notices, 1988.

Rodney A. Brooks, "Trading Data Space for Reduced Time and Code Space in Real-Time Garbage Collection on Stock Hardware," Proceedings of the 1984 ACM Symposium on Lisp and Functional Programming, pp. 108-113, Aug. 1984. Austin, Texas.

Herlihy and Moss, "Lock-Free Garbage Collection for Multiprocessors," ACM SPAA, 1991, pp. 229-236.

Bacon, Attanasio, Lee, Rajan, and Smith, "Java without the Coffee Breaks: A Nonintrusive Multiprocessor Garbage Collector," SIGPLAN Conference on Programming Language Design and Implementation, Snowbird, Utah, Jun. 2001.

James Stamos, "Static Grouping of Small Objects to Enhance Performance of a Paged Virtual Memory," ACM Transactions on Computer Systems, vol. 2, No. 2, pp. 155-180, May 1984.

David A. Moon, "Garbage Collection in a Large Lisp System," Conference Record of the 1984 ACM Symposium on LISP and Functional Programming, Austin, Texas, Aug. 1984, pp. 235-246.

Robert Courts, "Improving Locality of Reference in a Garbage-Collecting Memory Management System," Communications of the ACM, Sep. 1988, pp. 1128-1138, vol. 31, No. 9.

Wilson, Lam, and Moher, "Effective Static-Graph Reorganization to Improve Locality in Garbage Collected Systems," Proceedings of ACM SIGPLAN Conference on Programming Language Design and Implementation, Jun. 1991, Toronto, Ontario, Canada.

Lam, Wilson, and Moher, "Object Type Directed Garbage Collection to Improve Locality," Proceedings of the International Workshop on Memory Management '92, St. Malo, France, Sep. 1992, pp. 404-425.

Chilimbi and Larus, "Using Generational Garbage Collection to Implement Cache-Conscious Data Placement," International Symposium on Memory Management, Oct. 1998.

Lieberman and Hewitt, "A real-time garbage collector based on the lifetimes of objects," Communications of the ACM, 1983, pp. 419-429, vol. 26, No. 6.

David Ungar, "Generation Scavenging: A Non-Disruptive High Performance Storage Reclamation Algorithm," ACM SIGPLAN Notices, Apr. 1984, pp. 157-167, vol. 19, No. 5.

Andrew W. Appel, "Simple Generational Garbage Collection and Fast Allocation," Software Practice and Experience, 1989, pp. 171-183, vol. 19, No. 2.

Hudson and Diwan, "Adaptive Garbage Collection for Modula-3 and Smalltalk," in OOPSLA/ECOOP Workshop on Garbage Collection in Object-Oriented Systems, Oct. 1990, Edited by Eric Jul and Niels-Cristial Juul.

Hudson and Hosking, "Remembered sets can also play cards," in OOPSLA/ECOOP Workshop on Garbage Collection in Object-Oriented Systems, Oct. 1993, Edited by Moss, Wilson, and Zorn.

Hosking and Moss, "Protection traps and alternatives for memory management of an object-oriented language," ACM Proceedings of the Fourteenth ACM Symposium on Operating Systems Principles, Dec. 1993, pp. 106-119, vol. 27, No. 5.

Hosking, Moss, and Stefanovic, "A Comparative Performance Evaluation of Write Barrier Implementation," in OOPSLA ACM Conference on Object-Oriented Programming, Systems, Languages, and Applications, Oct. 1992, pp. 92-109, vol. 27, No. 10, ACM SIGPLAN Notices, Vancouver, BC, ACM Press.

Patrick G. Sobalvarro, "A Lifetime-based Garbage Collector for LISP Systems on General-Purpose Computers," Massachusetts Institute of Technology, AITR-1417, 1988.

U.S. Appl No. 10/287,851, filed Nov. 5, 2002, inventor Garthwaite, et al.

Appleby, Karen, "Garbage Collection for Prolog Based on WAM, vol. 31, Issued 6", Communication of the ACM, Jun. 1, 1998, 719-741.

Arora, et al., "Thread Scheduling for Multiprogrammed Multiprocessors", Proceedings of the 10th Annual ACM Symposium on Parallel Algorithms and Architecture, Jun. 1998.

Barrett, et al., "Using Lifetime Predictors to Improve Memory Allocation Performance", SIGPLAN'93 Conference on Programming Languages Design and Implementation vol. 28(6) of Notices, Jun. 1993, 187-196, ACM Press, Albuquerque, NM.

Blackburn & McKinley, "In or Out? Putting Write Barriers in Their Place", Jun. 20, 2002, Berlin.

Clark, "An Efficent List-Moving Algorityhm Using Constant Workspace, vol. 19 No. 6"Communications of the ACM, Jun. 1976, 352-354.

Flood, et al., "Parallel Garbage Collection for Shared Memory Multiprocessors", USENIX JVM Conference, Apr. 2001.

Goldstein, et al., "Lazy Threads: Implementing a Fast Parallel Call, vol. 37, No. 1", Journal of Parallel and Distributed Computing, Aug. 1996, 5-20.

Hanson, "Fast Allocation and Deallocation of Memory Based on Object Lifetimes", Software Practice and Experience, Jan. 1990, 20(1):5-12.

Harris, "Dynamic Adaptive Pre-Tenuring", In Proceedings of the int'l Symposium on Memory Management, Oct. 2000, 127-136.

Holzle, Urs, "A Fast Write Barrier for Generational Garbage Collectors", Workshop on Garbage Collection in Object Oriented Systems, Oct. 1993.

Hudson, et al., "A Language - Independent Garbage Collector Toolkit", Coins Technical Report, Sep. 1991.

Hudson, et al., "Training Distributed Garbage; The DMOS Collector", University of St. Andrews Tech Report, 1997, 1-26.

Hudson, et al., "Garbage Collecting the World: One Car at a Time", ACM SIGPLAN Notices 32, 1997, 162-175.

Hudson, et al., "Sapphire: Copying GC Without Stopping the World", Practice and Experience Special Issue, Date Unknown, JAVA/Grande/Iscope.

Liskov, et al., "Partitioned Garbage Collection of a Large Stable Heap", Proceedings of IWOOOS, 1996, 117-121.

Moss, et al., "A Complete and Coarse-Grained Incremental Garbage Collection for Persisten Object Strores", Proceedings 7th Int'l Workshop on Persisten Object System, 1996, 1-13, Cape May, NJ.

Munro, et al., "Incremental Garbage Collection of a Persistent Object Store using PMOS", 3rd Int'l Workshop on Persistence and Java, 1998, 78-91, Tiburon, California.

Nettles, Scott, "Real-Time Replication Garbage Collecton", Avionics Lab, Wright Research and Development Center, 1993, PDDI.

Padopoulos, "Hood: A User-Level Thread Library for Multiprogramming Multiprocessors, Thesis: The Uni. of TX", University of Texas, Aug. 1998, 1-71, Austin.

Roy, et al., "Garbage Collection in Object-Oriented Databse Using Transactional Cyclic Reference Counting", VLDB Journal - The International Journal on Very Large Da Bases, vol. 7, Issue 3, 1998, 179-193.

Shuf, et al., "Exploiting Profilic Types for Memory Management and Optimizations. ACM ISBN 9/2/01", POPL., Jan. 2002, Portland.

Ungar, et al., "Tenuring Policies for Generation-Based Storage Reclamation", ACM SIGPLAN Notices, 1988, 23(11)1-17.

Venners, "Garbage Collection, Inside the Java 2 Virtual Machine; Chapter 9", www.artima.com, Date Unknown, parts 1-18.

Wilson, "Uniprocessor Garbage Collection Techniques", Proceedings of int'l Workshop on Memory Management, 1992, v. 637.

Withington, P.T., "How Real is "Real Time" GC?", Symbolics, Inc., Oct. 6, 1991, Burlington, MA.

Zee, et al., "Write Barrier Removal by Static Analysis", OOPSLA '02, Nov. 2002.

Zorn, et al., "Segregating Heap Objects by Reference Behavior and Lifetime", In 8th int'l Conferenceon Architectural Support for Programmning Languages and Operating Systems, Oct. 1998, 12-32, San Jose, CA.

Zorn, Benjamin, "Barrier Methods for Garbage Collection", Dept. of Computer Science, Uni. of Colorado, Nov. 1990, 1-37, Boulder.

Azagury, et al., "Combining Card Marking With Remembered Sets: How to Save Scanning Time", ACM SIGPLAN Notices, Oct. 1998, v. 34(3), ACM Press, Vancouver, Canada.

Cheney, "A Nonrecursive List Compacting Algorithm, vol. 13, No. 11", Communications of the ACM, Nov. 1970, 677-678, Uni. Math. Lab., Cambridge, European Patent Office.

Cheng, et. al., "Generational Stack Collection and Profile-Driven Pretenuring", SIGPLAN'98 Conference on Programming Languages Design and Implementation, Jun. 1998, 162-173, ACM PRESS, Montreal, Canada.

Lam, et. al., "Object Type Directed Garbage Collection to Improve Locality", Proceedings of the International Workshop on Memory Management, Sep. 1992, 404-425, St. Malo, France.

Pirinen, Pekka, "Barrier Techniques for Incremental Tracing", Harlequin Limited, Date Unknown, 20-25, Cambridge, Great Britain.

* cited by examiner

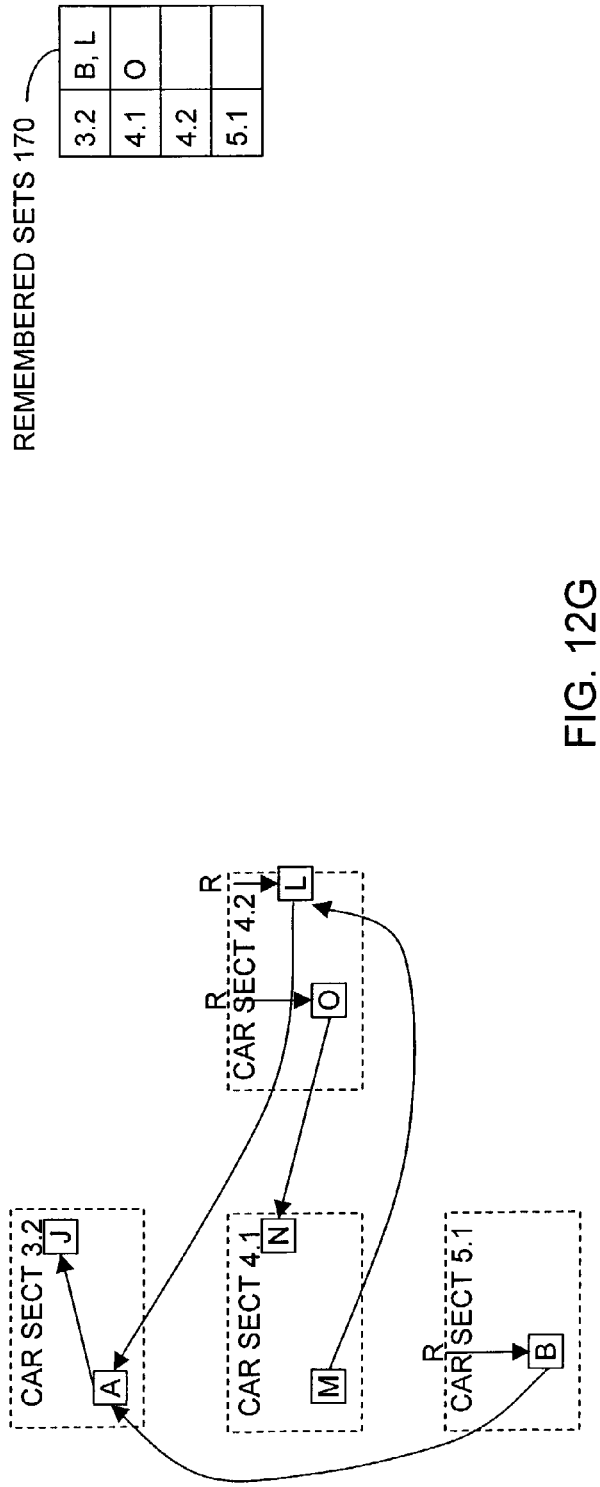
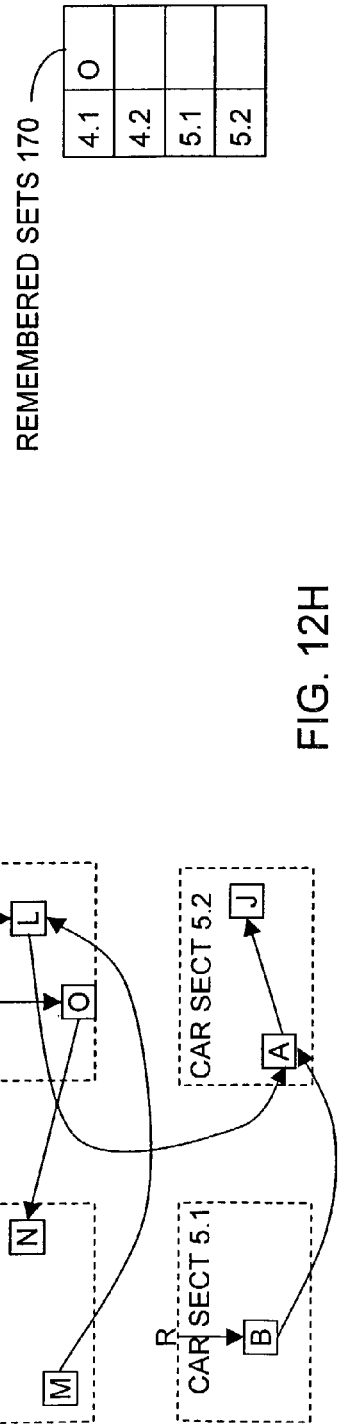
FIG. 12G
FIG. 12H

US 7,031,990 B2

COMBINING EXTERNAL AND INTRAGENERATIONAL REFERENCE-PROCESSING IN A GARBAGE COLLECTOR BASED ON THE TRAIN ALGORITHM

CROSS-REFERENCE TO RELATED APPLICATION

The present application is related to U.S. Patent Application Ser. No. 10/313,878 of Alexander T. Garthwaite for Detection of Dead Regions during Incremental Collection, which was filed on the same day as this application.

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space is to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files's byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. We will refer to the just-in-time compiler and the interpreter together as "execution engines" since they are the methods by which byte code can be executed.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; the allocation of such objects must be mediated by the garbage collector.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The execution engines and the runtime system of a virtual machine are designed together so that the engines "know" what runtime-system procedures are available in the virtual machine (and on the target system if that system provides facilities that are directly usable by an executing virtual-machine program.) So, for example, the just-in-time compiler 29 may generate native code that includes calls to memory-allocation procedures provided by the virtual machine's runtime system. These allocation routines may in turn invoke garbage-collection routines of the runtime system when there is not enough memory available to satisfy an allocation. To represent this fact, FIG. 3 includes block 30 to show that the compiler's output makes calls to the runtime system as well as to the operating system 31, which consists of procedures that are similarly system-resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

The arrangement of FIG. 3 differs from FIG. 2 in that the compiler 23 for converting the human programmer's code does not contribute to providing the garbage-collection function; that results largely from the virtual machine 27's operation. Those skilled in that art will recognize that both of these organizations are merely exemplary, and many modem systems employ hybrid mechanisms, which partake of the characteristics of traditional compilers and traditional interpreters both.

The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process.

And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap.

Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations," although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young generation collection to find references into the mature generation. Even when such collectors do use card tables, therefore, they often do not use them for finding young generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection cycle to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections's train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection cycle. To illustrate how such updating and other collection operations may be carried out, FIGS. 8A and 8B (together, "FIG. 8") depict an operational sequence in a system of the typical type mention above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains's sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is ups dated to point to the evacuated object's new location, as block 130 indicates.

And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A–12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars's contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

The foregoing example shows that incremental collection—and train-algorithm collection in particular—provide a way to perform garbage collection effectively while reducing the incidence of excessively long pause times. But it can add significant overhead; identifying the locations of references to collection-set objects and evacuating collection-set objects thereby found to be potentially reachable can be expensive.

SUMMARY OF THE INVENTION

I have found that this overhead can be reduced significantly by performing these tasks's constituent operations in an order different from that described above.

BRIEF DESCRIPTION OF THE DRAWINGS

The invention description below refers to the accompanying drawings, of which:

FIGS. 12A–12J, discussed above, are diagrams that illustrate a collection scenario that can result from using the train algorithm;

DETAILED DESCRIPTION OF AN ILLUSTRATIVE

EMBODIMENT

Although various aspects of the invention can be employed in incremental collectors that do not necessarily employ the train algorithm or operate in dedicated collection intervals, it will be exemplified below by such collectors.

Figure 13A:
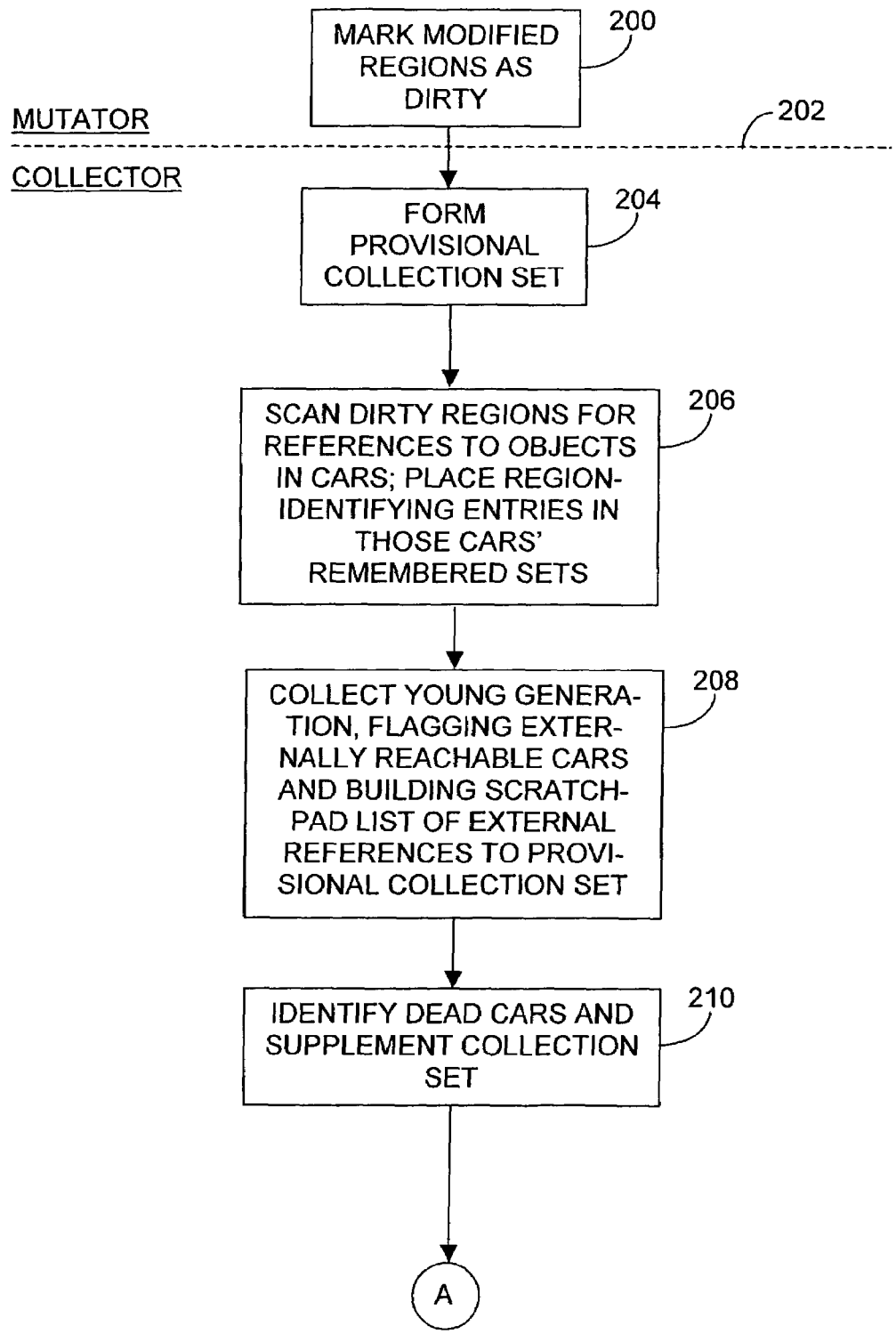
FIGS. 13A and 13B together form a flow chart that illustrates a collection increment executed by one example embodiment of the present invention.
Figure 13B:
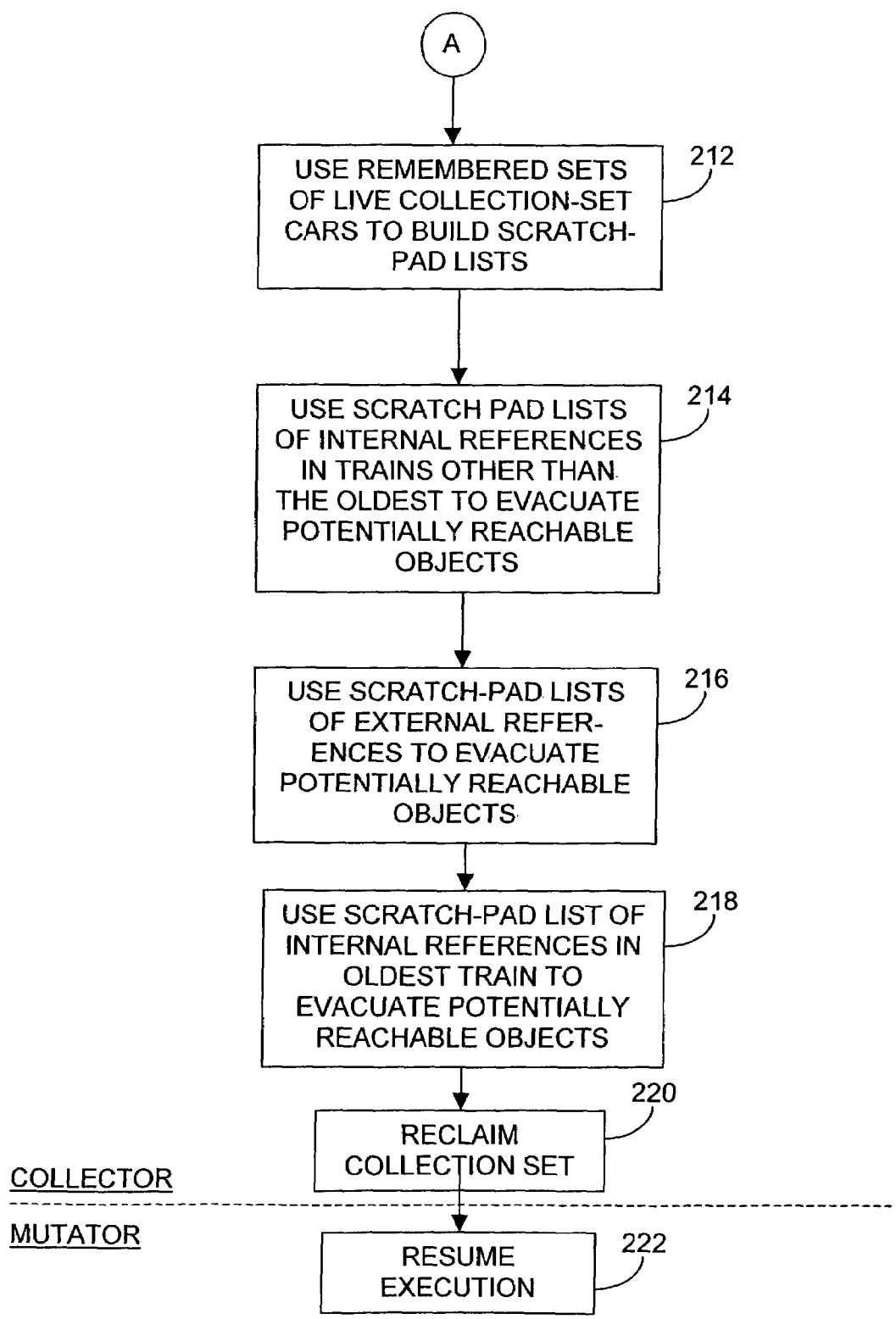

FIGS. 13A and 13B (together, "FIG. 13") are a flow chart of a collection increment in which one example garbage collector collects a train-algorithm-managed generation. Block 200 represents normal mutator operation, in which the mutator memorializes reference modifications by employing write barriers. The write barriers may employ a card table or other mechanism to indicate which regions in the generation have become "dirty" between collection intervals. Dashed line 202 represents the boundary between the preceding mutator interval and the collection interval in which the collection increment takes place.

Figure 14A:
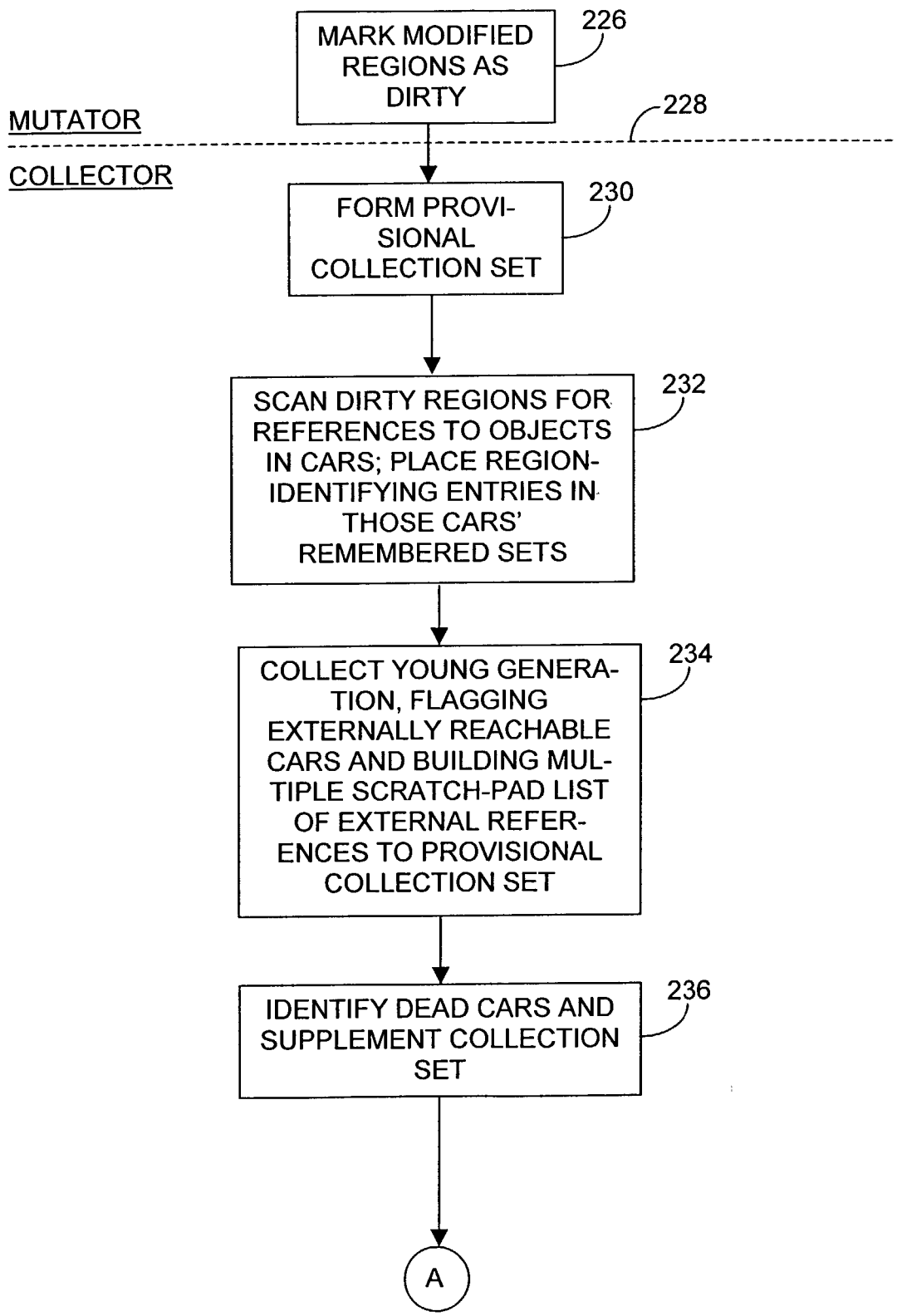
FIGS. 14A and 14B together form a flow chart that illustrates a collection increment executed by another example of the present invention.
Figure 14B:
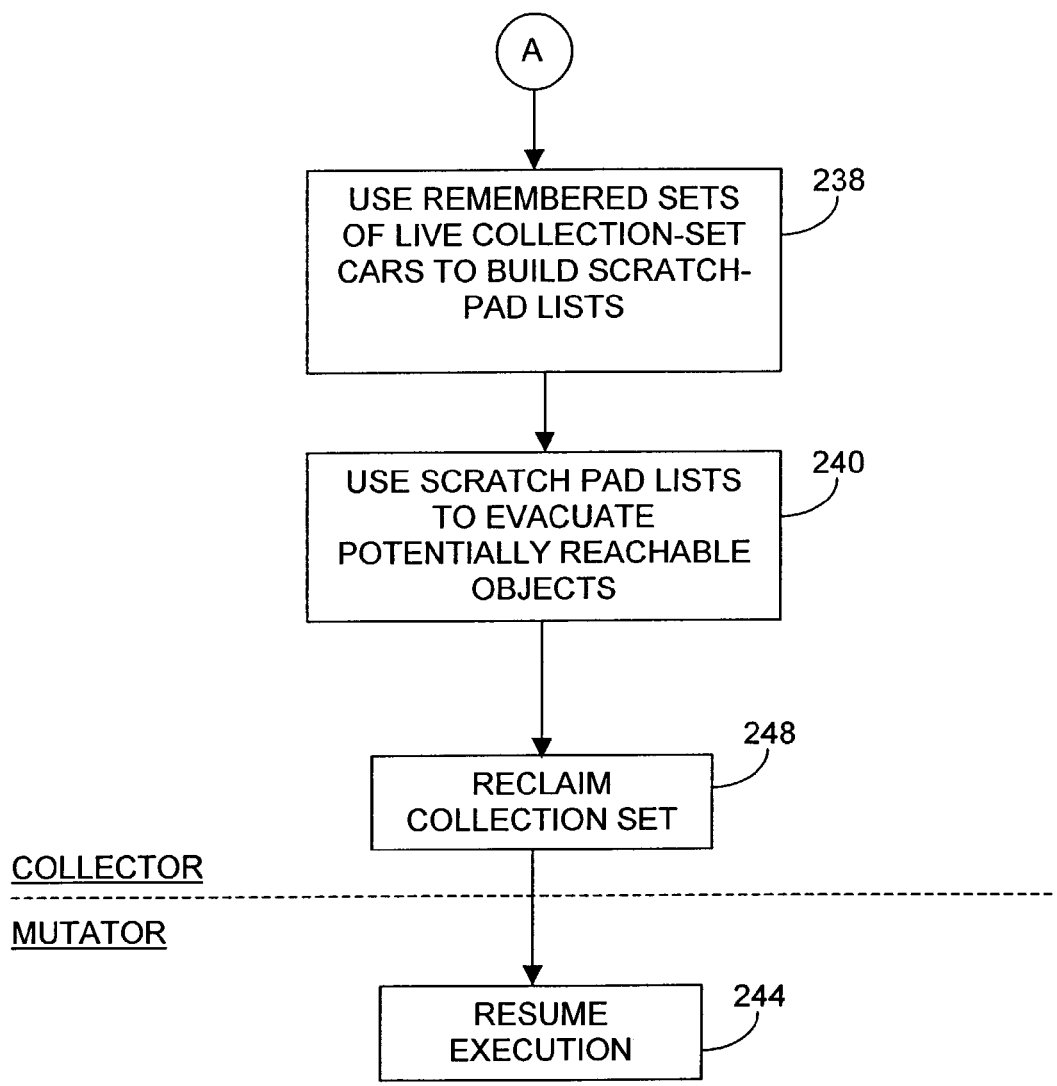

Whereas it was assumed in the preceding discussion that each collection interval involved collection of only a single, oldest car in the generation, the example of FIG. 14 will not be so limited. For this reason, that drawing includes block 204, which represents selecting the car or cars that will belong to the collection set. The location of that block is somewhat conceptual, since formation of the collection set will in many cases have been performed by operations that occur at other times, even before the collection interval in which the collection set is to be collected. On the other hand, the membership in the collection set is, as will become apparent below, provisional at this point in the process: although certain initial operations will depend on the membership of that provisional collection set, and the collection set's membership may change before collection has been completed.

This variability in collection-set size will be a feature exhibited by most of the present invention's embodiments, although some may use a conventional, single-oldest-car approach. Among the embodiments that do employ some variability in collection-set size, the particular approach to arriving at the provisional collection set's membership is not critical. In most cases, though, that membership will be dictated to some degree by the need to limit pause times.

Block 206 represents the operation of scanning dirtied cards for references and, for each car section in the generation, memorializing in those cars's remembered sets the locations where references to their objects have been found. In this example, we will assume that the collector employs two generations, namely, a young generation and an old generation, and that the old generation is the sole train-algorithm-managed generation. In such a situation, the locations of references in the old generation to objects in the young generation would be memorialized at this time, too, but typically only by recording them against the young generation as a whole, not against individual sections within it.

In any event, the young generation is then collected, as block 208 indicates. The operation of identifying potentially reachable objects in the young generation begins, as was explained above, with an expanded root set. That is, the basic root set is supplemented by references in the old generation that refer to young-generation objects. To identify such references, the collector scans the references in the basic root set and additionally scans those locations in the old generation in which previous dirty-card-scanning operations have found references to young-generation objects. When the collector thereby finds references to young-generation objects, it considers those objects to be potentially reachable, and it follows potentially reachable objects' references to other objects, which it thereby also considers potentially reachable.

Figure 1:
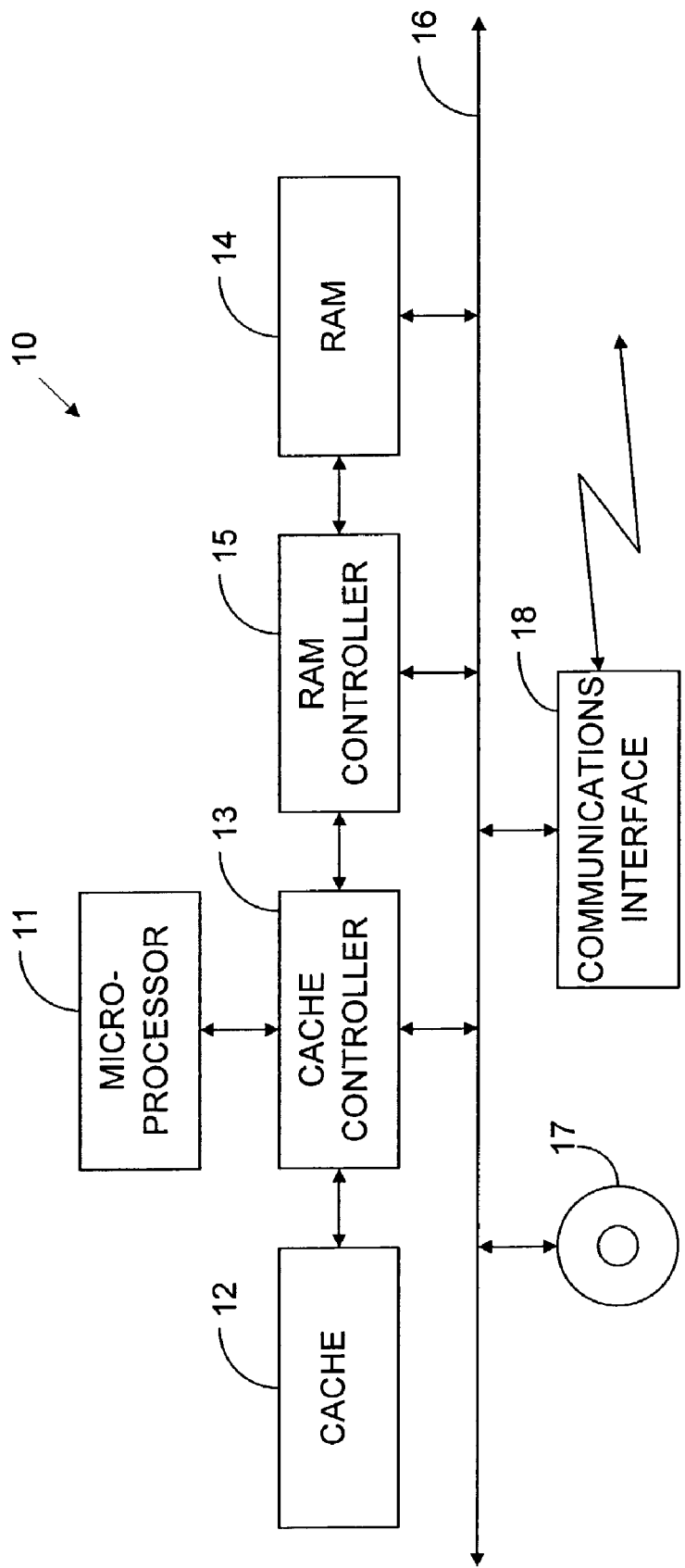
FIG. 1, discussed above, is a block diagram of a computer system in which the present invention's teachings can be practiced.
Figure 2:
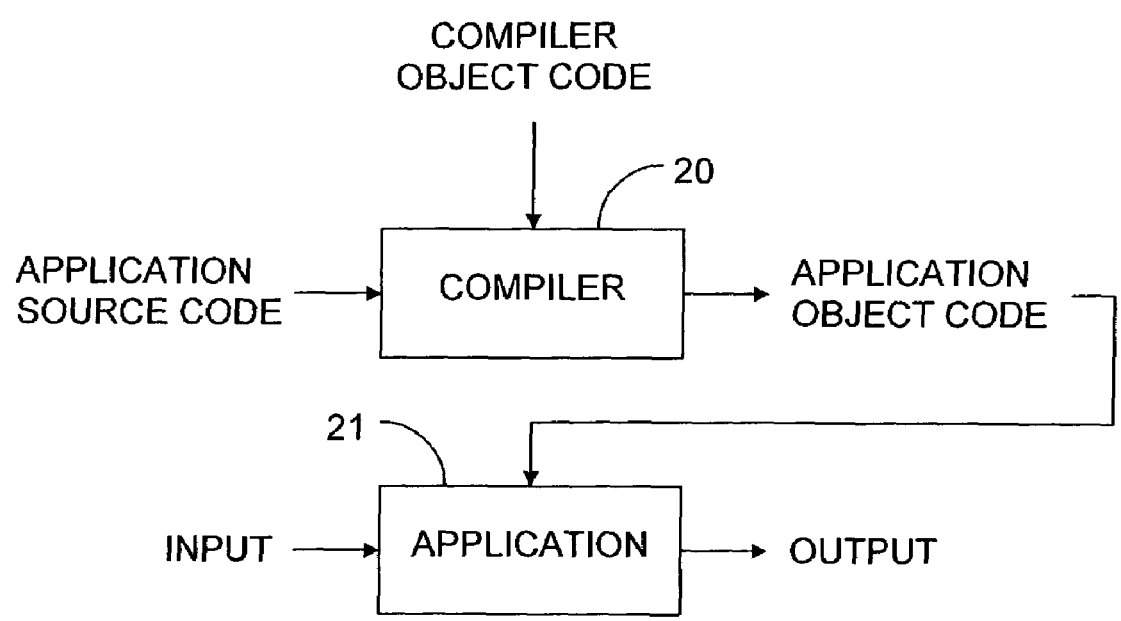
FIG. 2 as, discussed above, is a block diagram that illustrates a compiler's basic functions.
Figure 3:
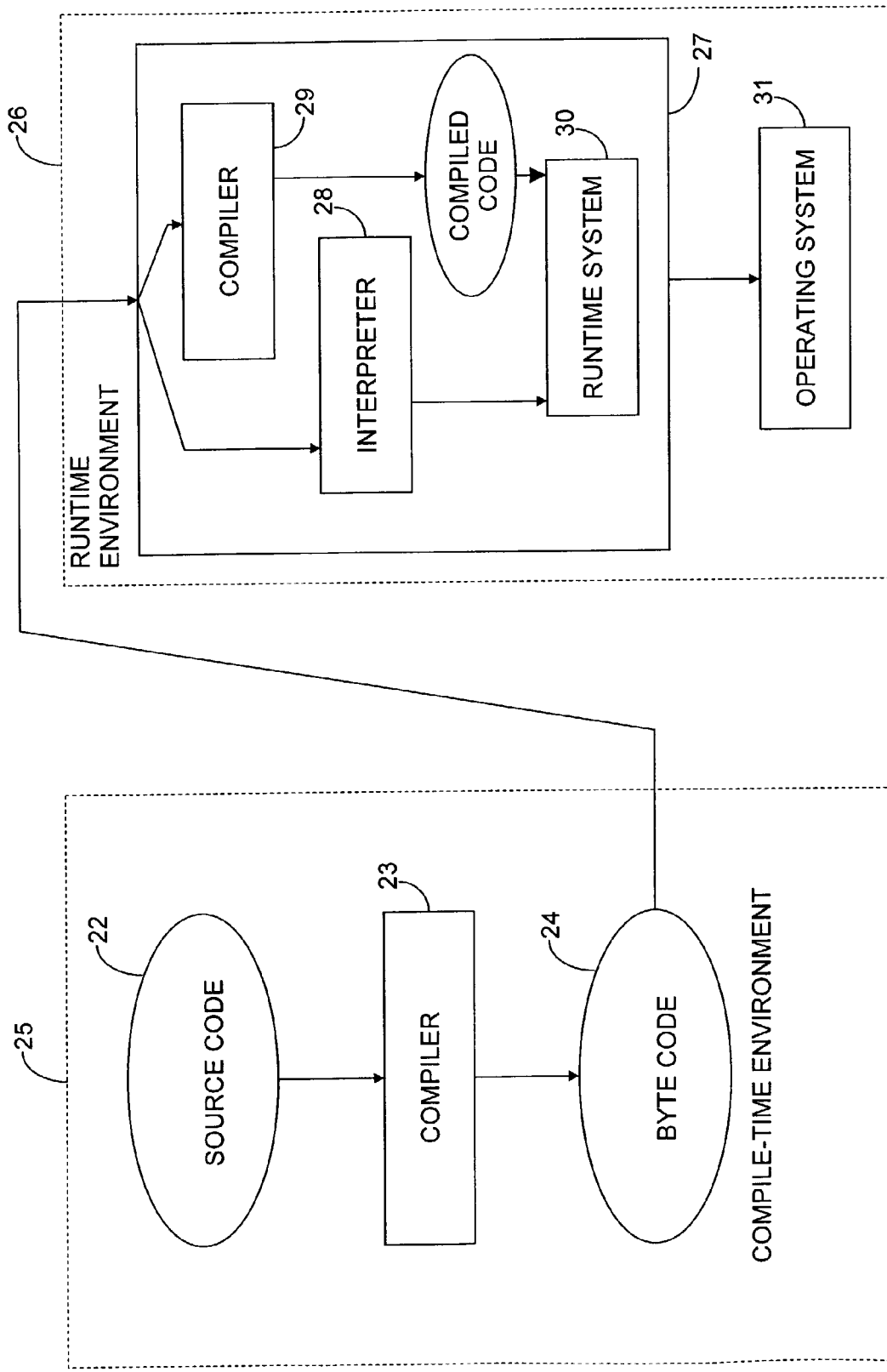
FIG. 3, discussed above, is a block diagram that illustrates a more-complicated compiler/interpreter organization.
Figure 4:
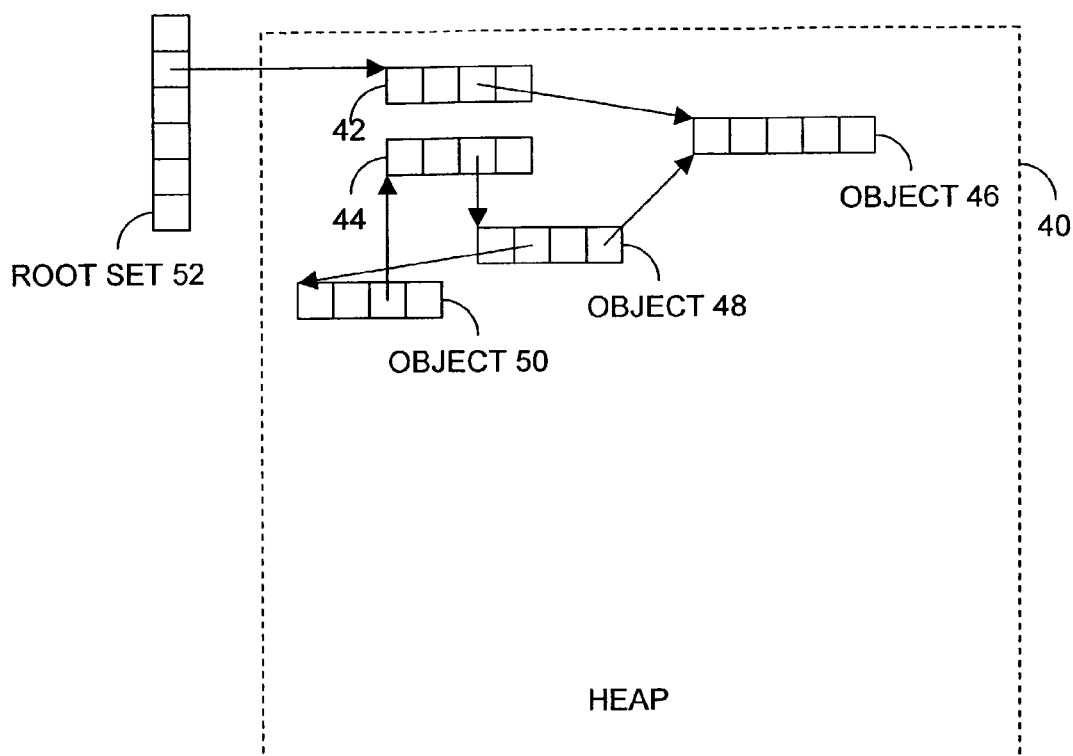
FIG. 4, discussed above, is a diagram that illustrates a basic garbage-collection mechanism.
Figure 5:
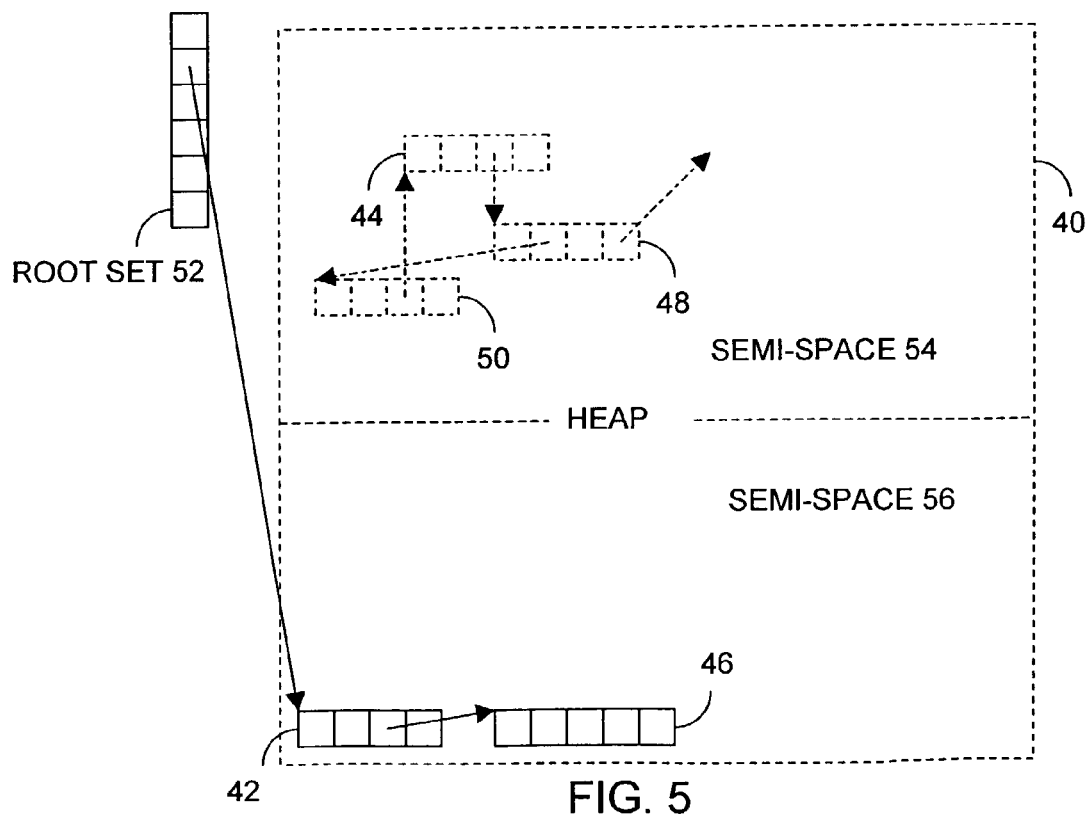
FIG. 5, discussed above, is a similar diagram illustrating that garbage-collection approach's relocation operation.
Figure 6:
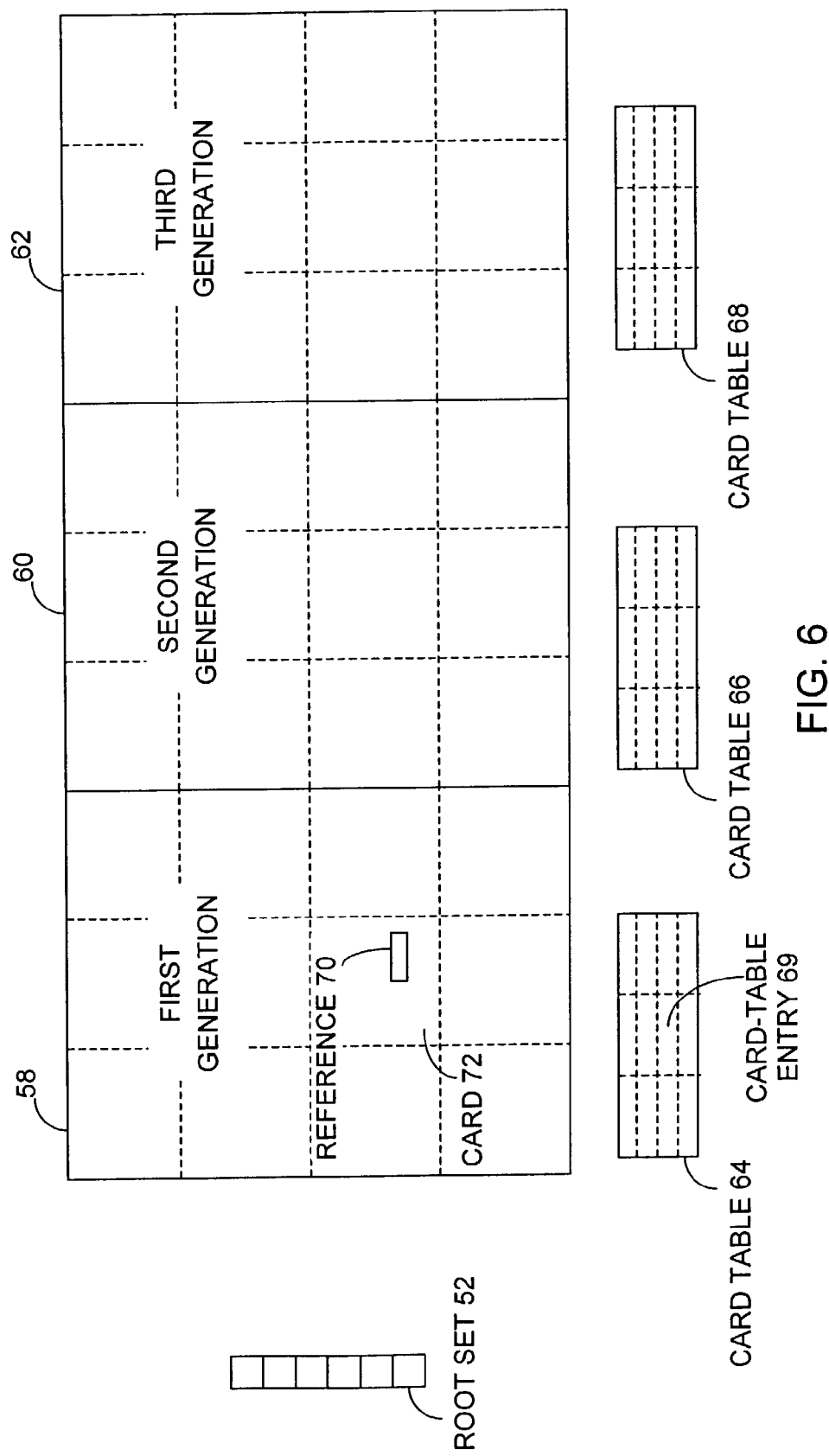
FIG. 6, discussed above, is a diagram that illustrates a garbage-collected heap's organization into generations.
Figure 7:
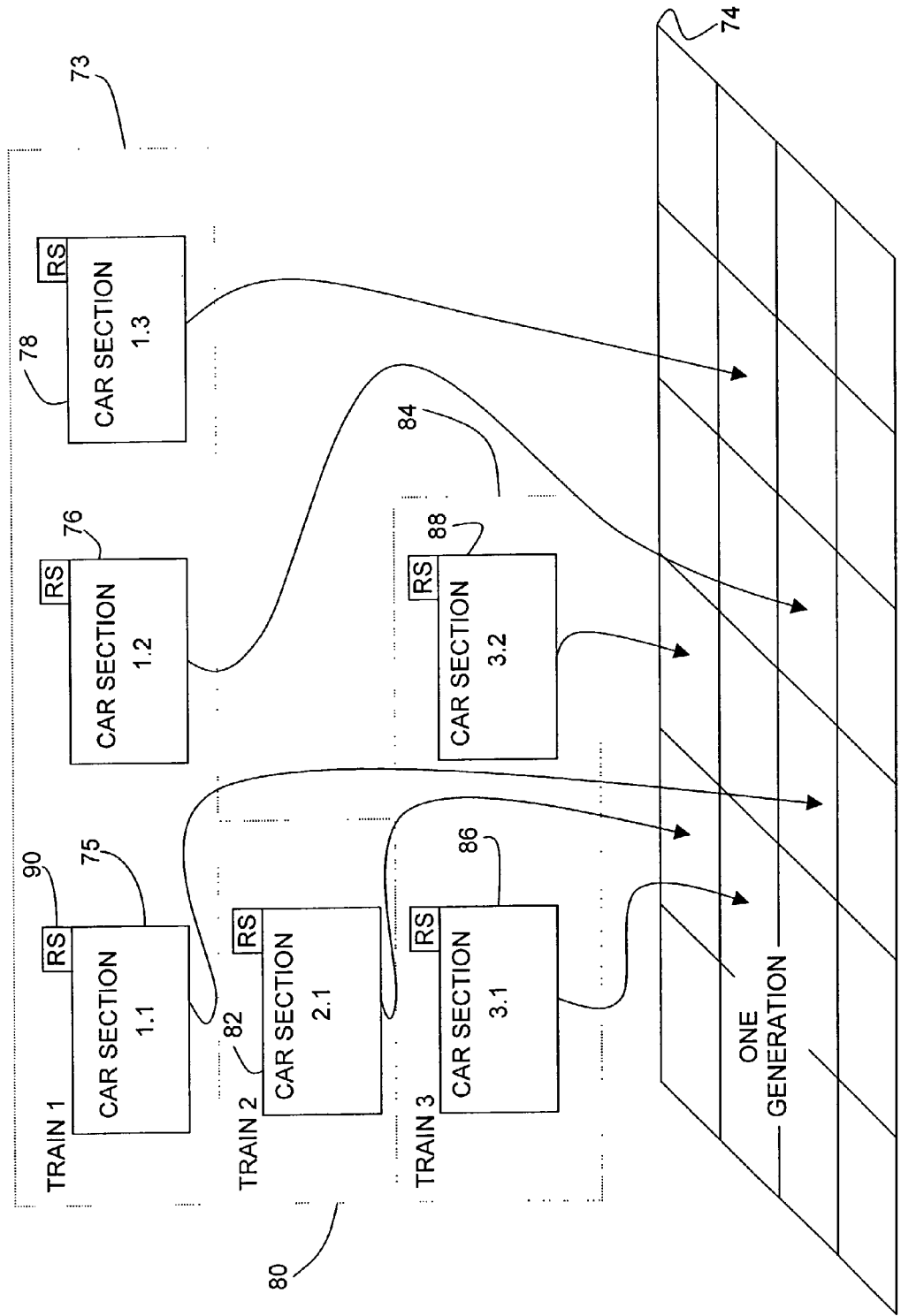
FIG. 7, discussed above, is a diagram that illustrates a generation organization employed for the train algorithm.
Figure 8A:
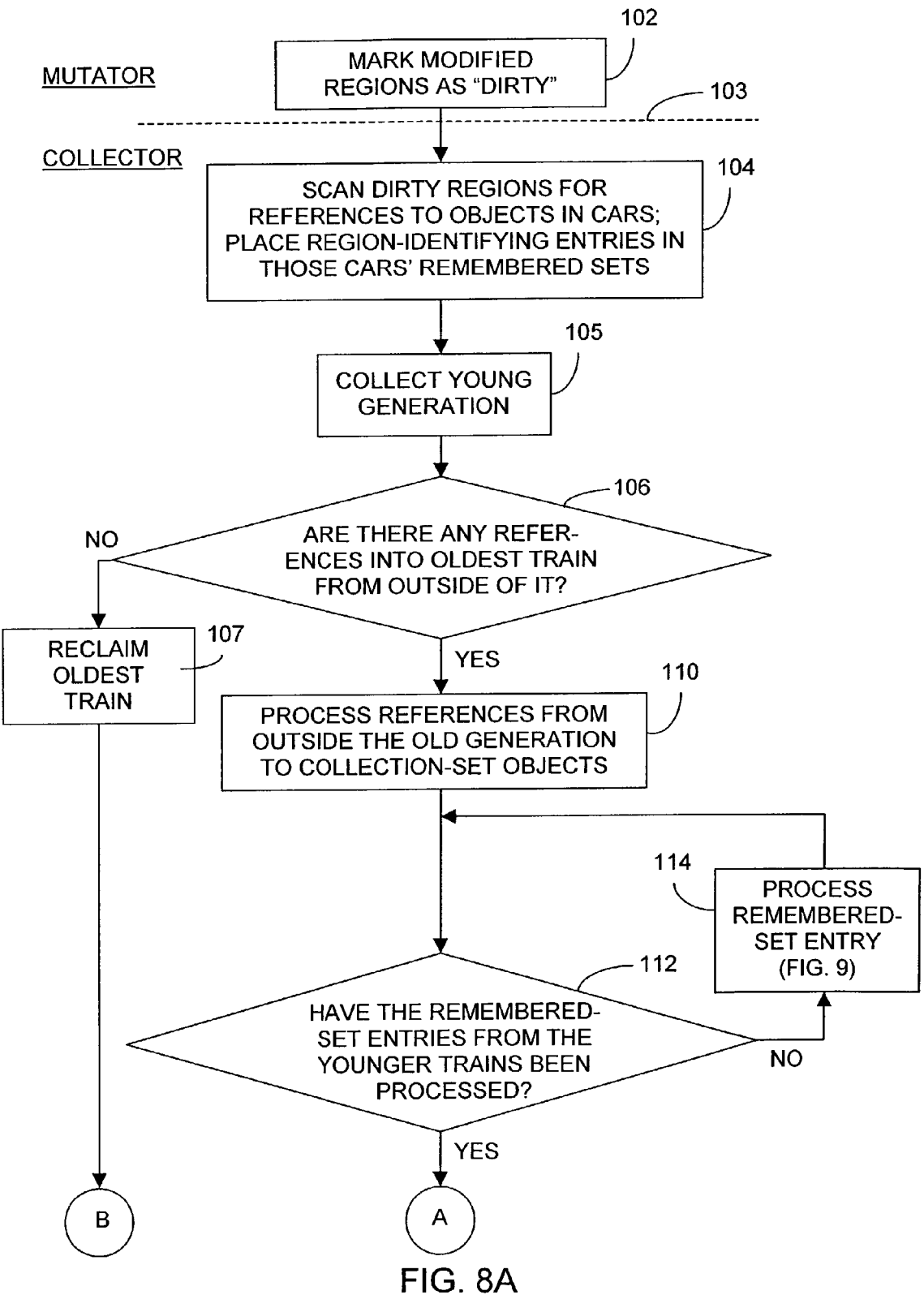
FIGS. 8A and 8B, discussed above, together constitute a flow chart that illustrates a garbage-collection interval that includes old-generation collection.
Figure 8B:
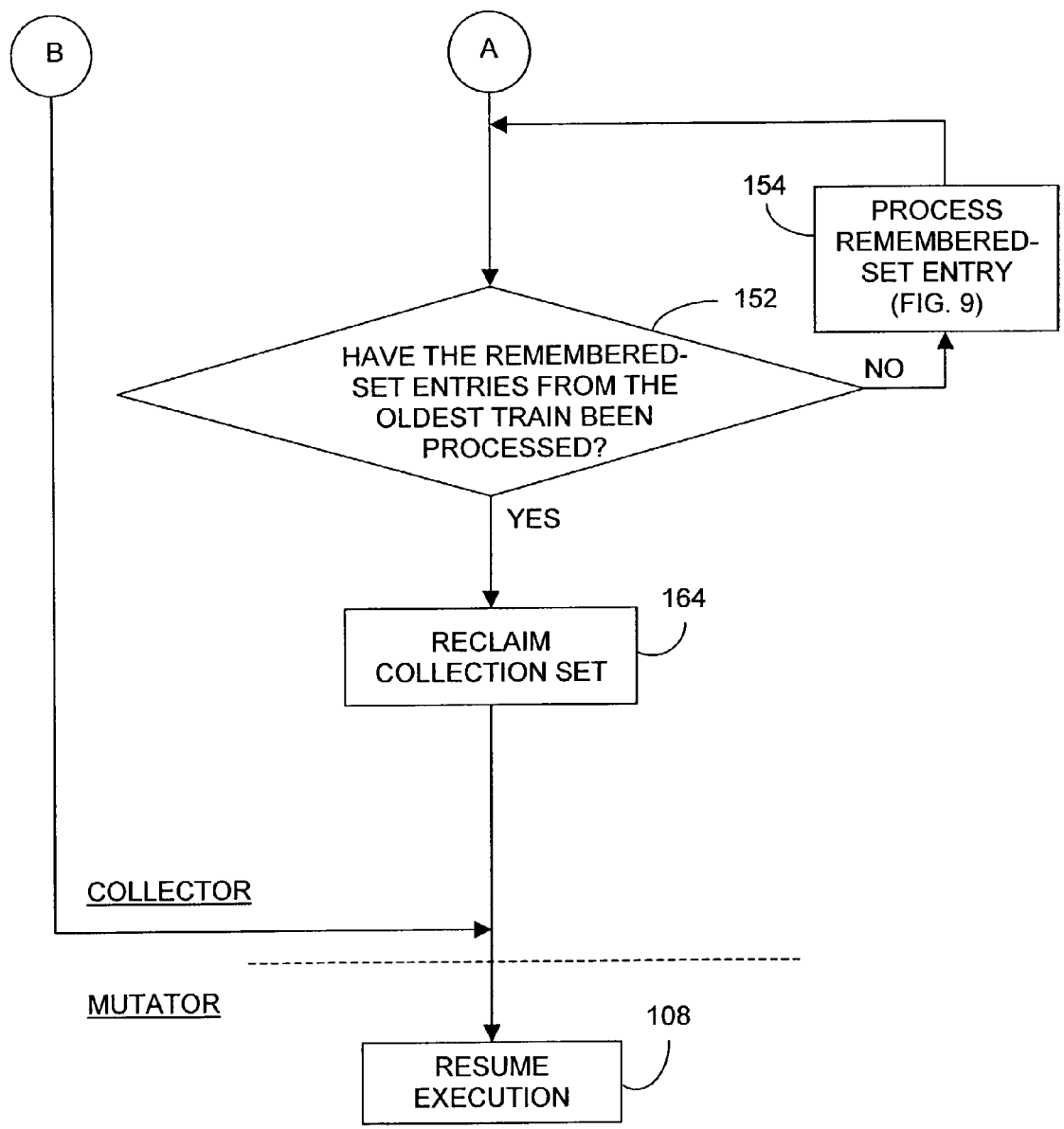
Figure 9:
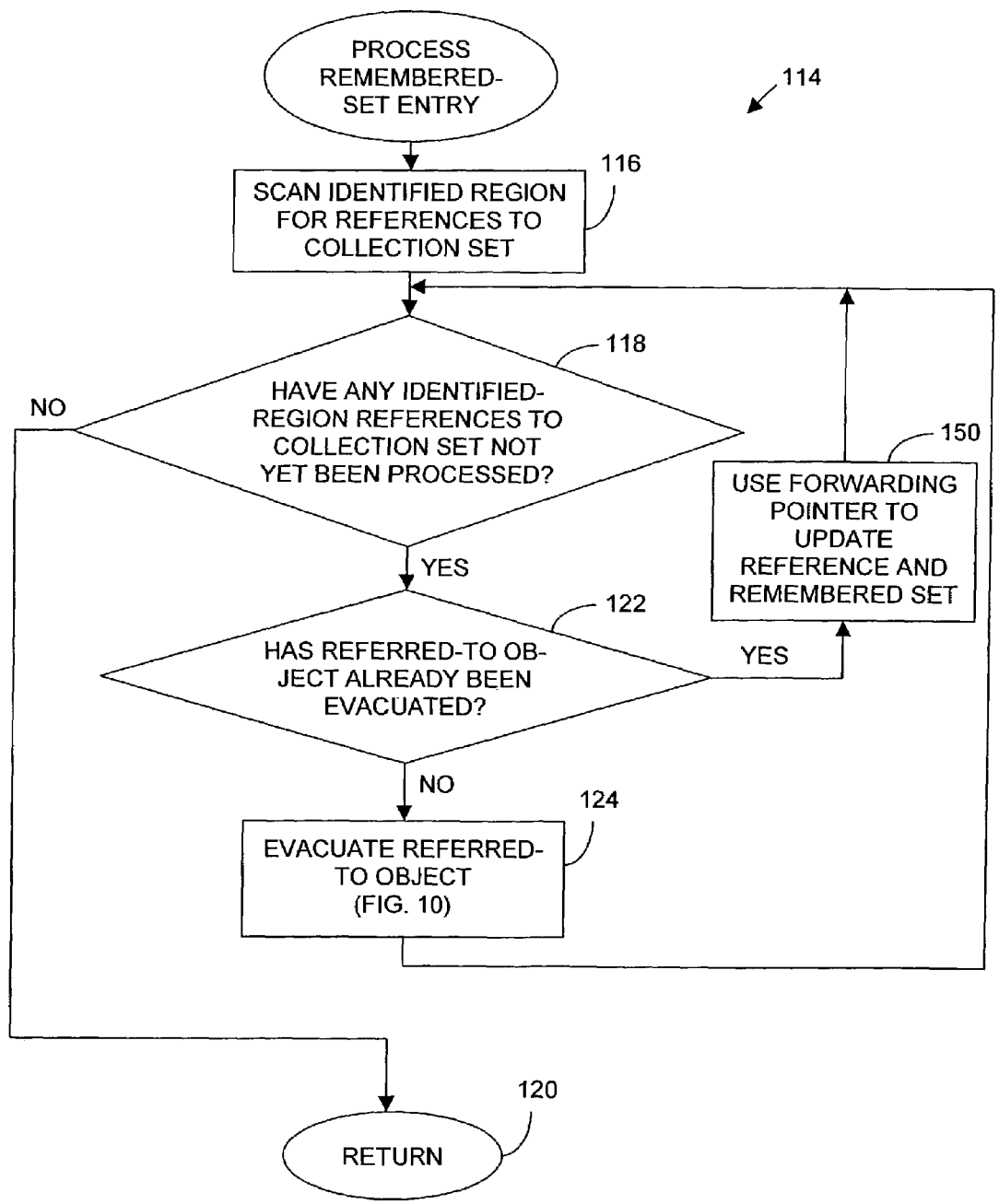
FIG. 9, discussed above, is a flow chart that illustrates in more detail the remembered-set processing included in FIG. 8A.
Figure 10:
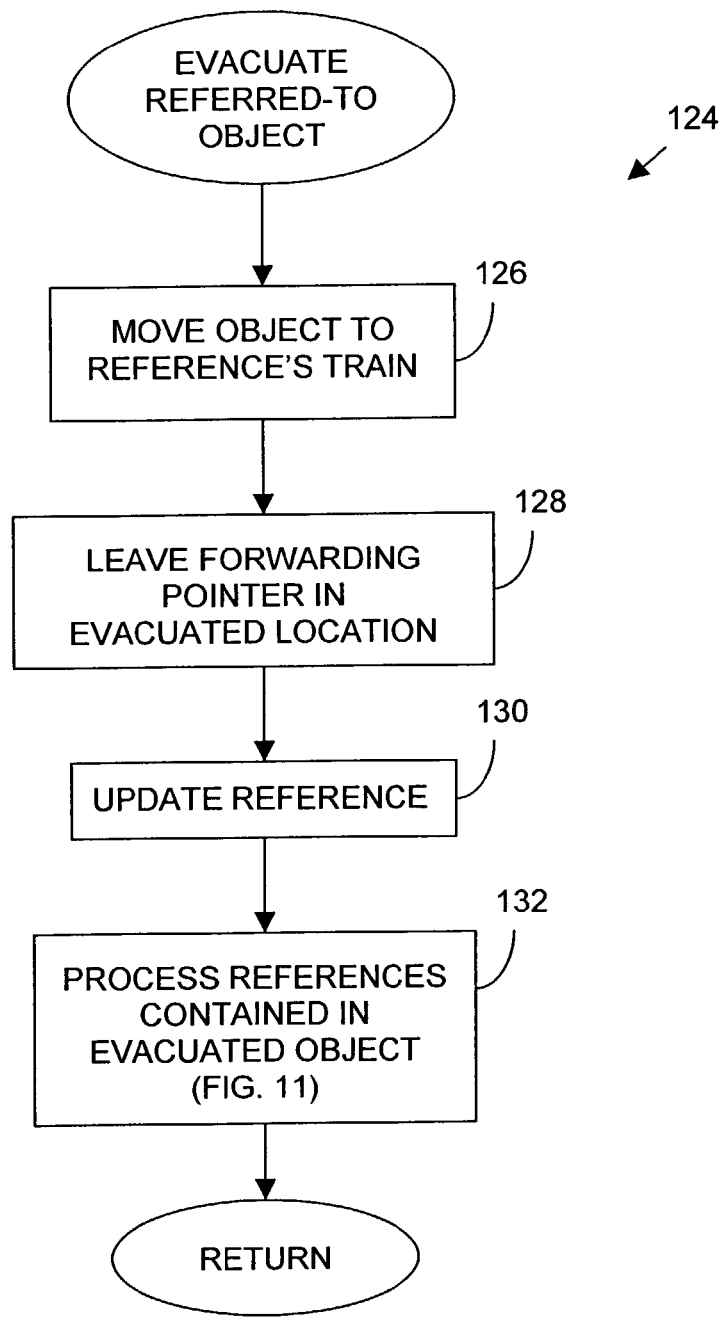
FIG. 10, discussed above, is a block diagram that illustrates in more detail the referred-to-object evacuation that FIG. 9 includes.
Figure 11A:
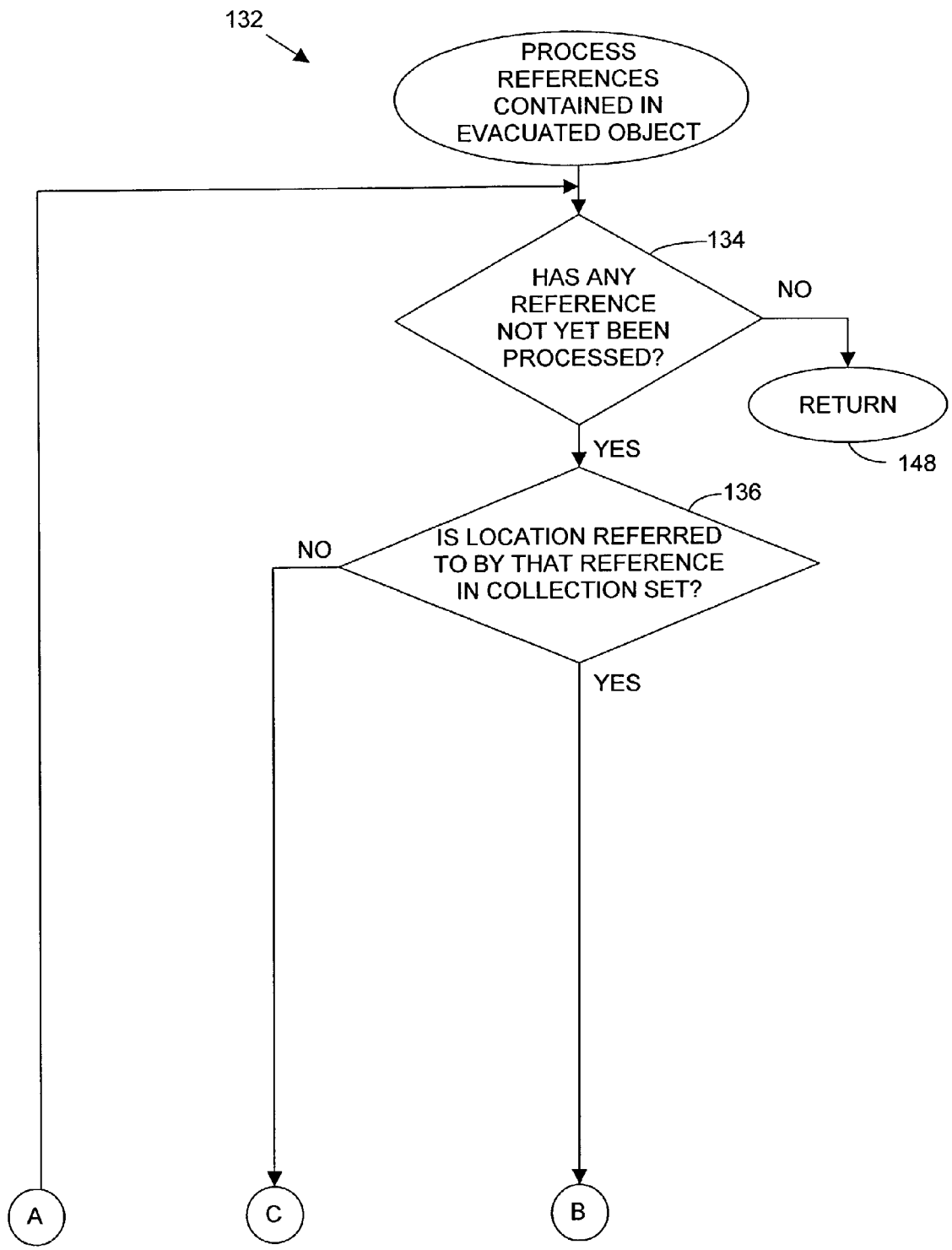
FIGS. 11A and 11B, discussed above, together form a flow chart that illustrates in more detail the FIG. 10 flow chart's step of processing evacuated objects's references.
Figure 11B:
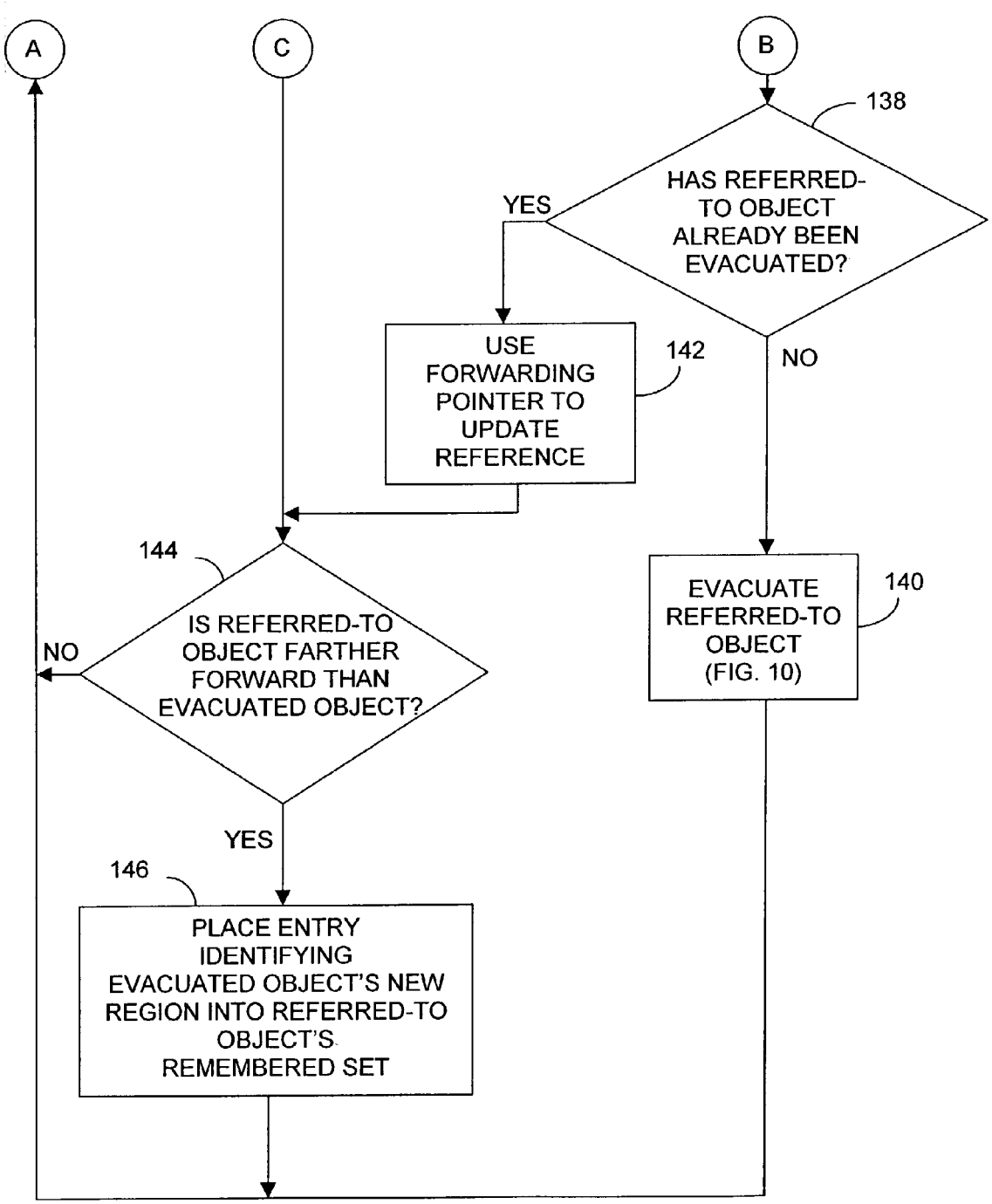
Figure 12A:
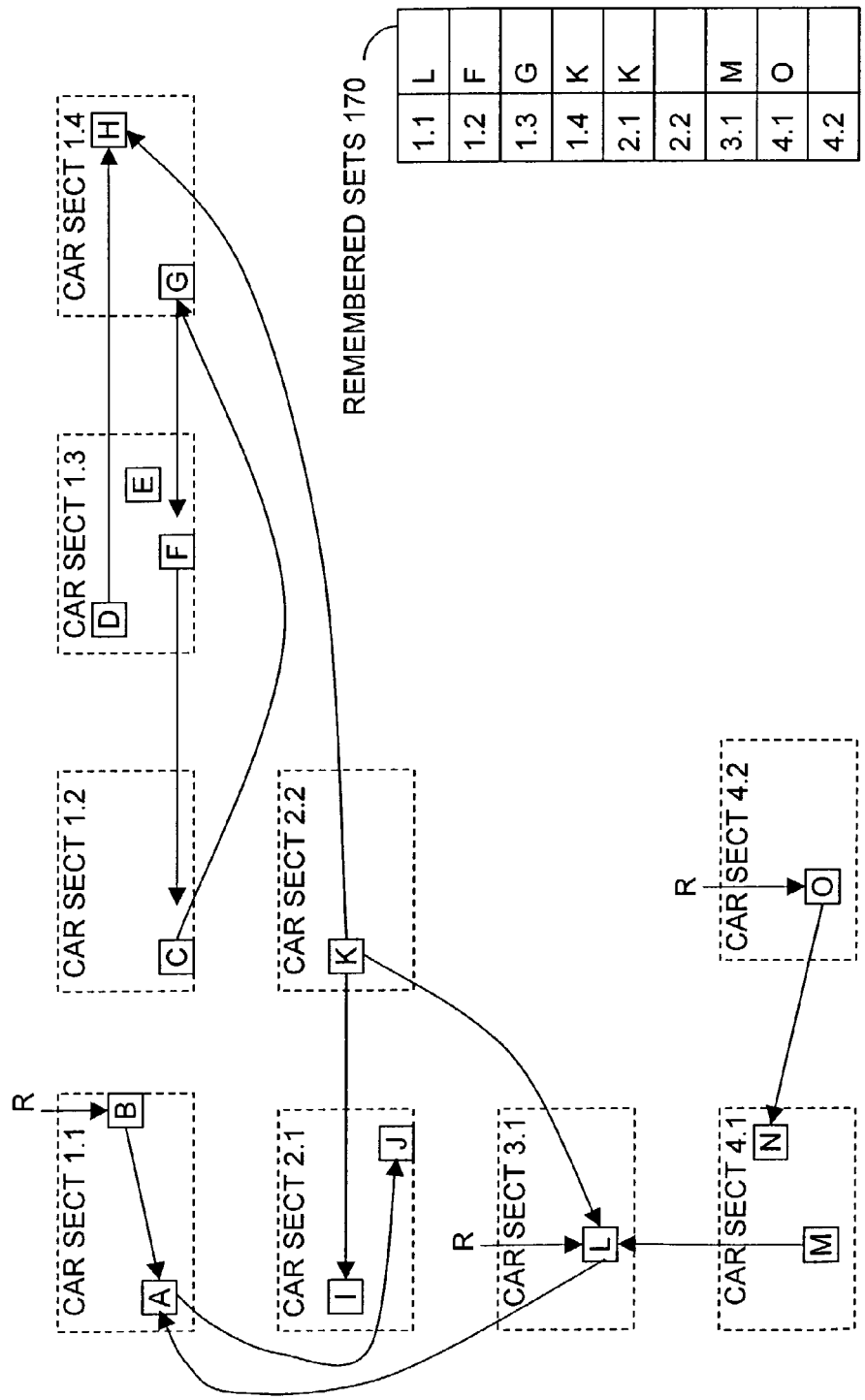
Figure 12B:
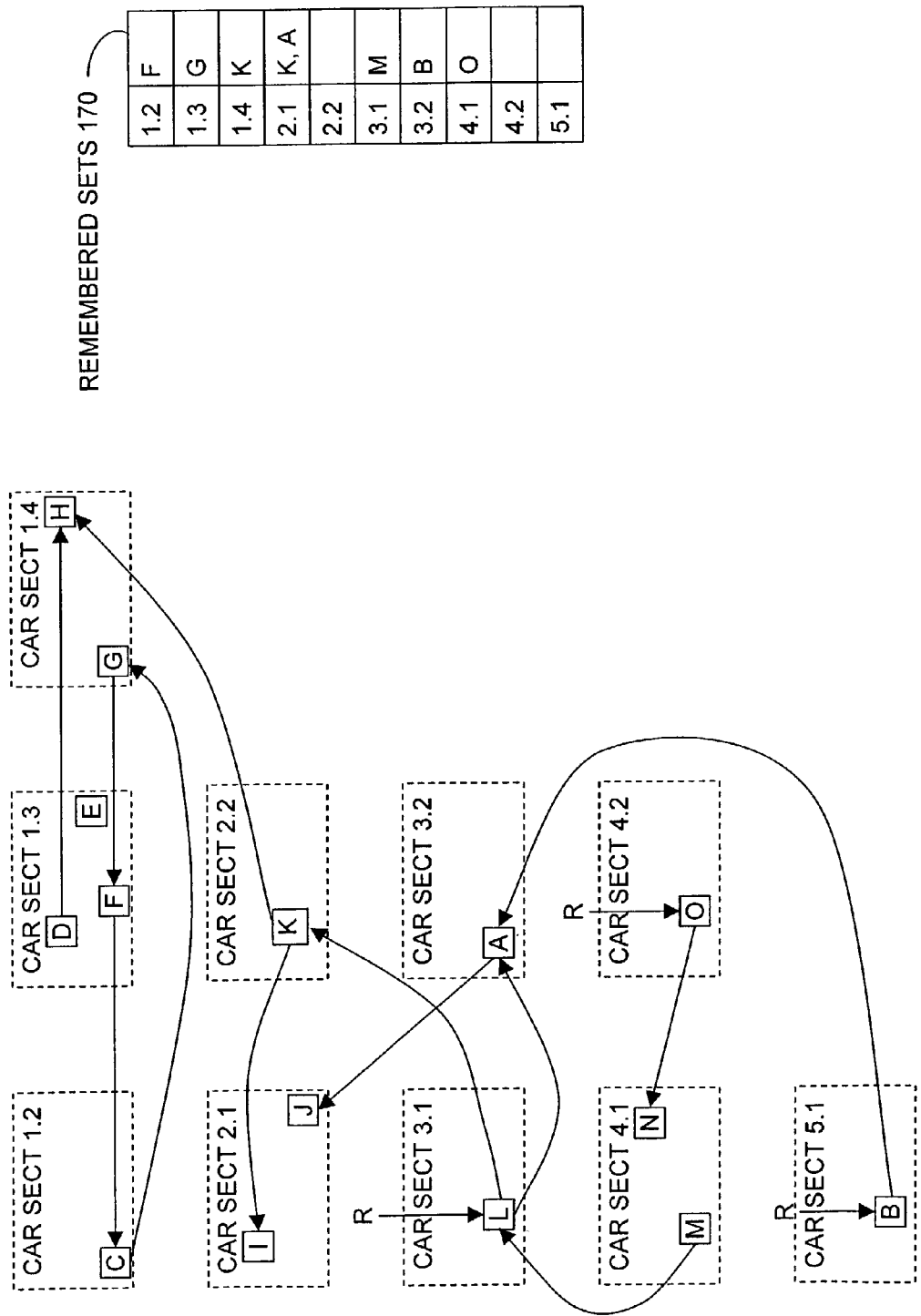
Figure 12C:
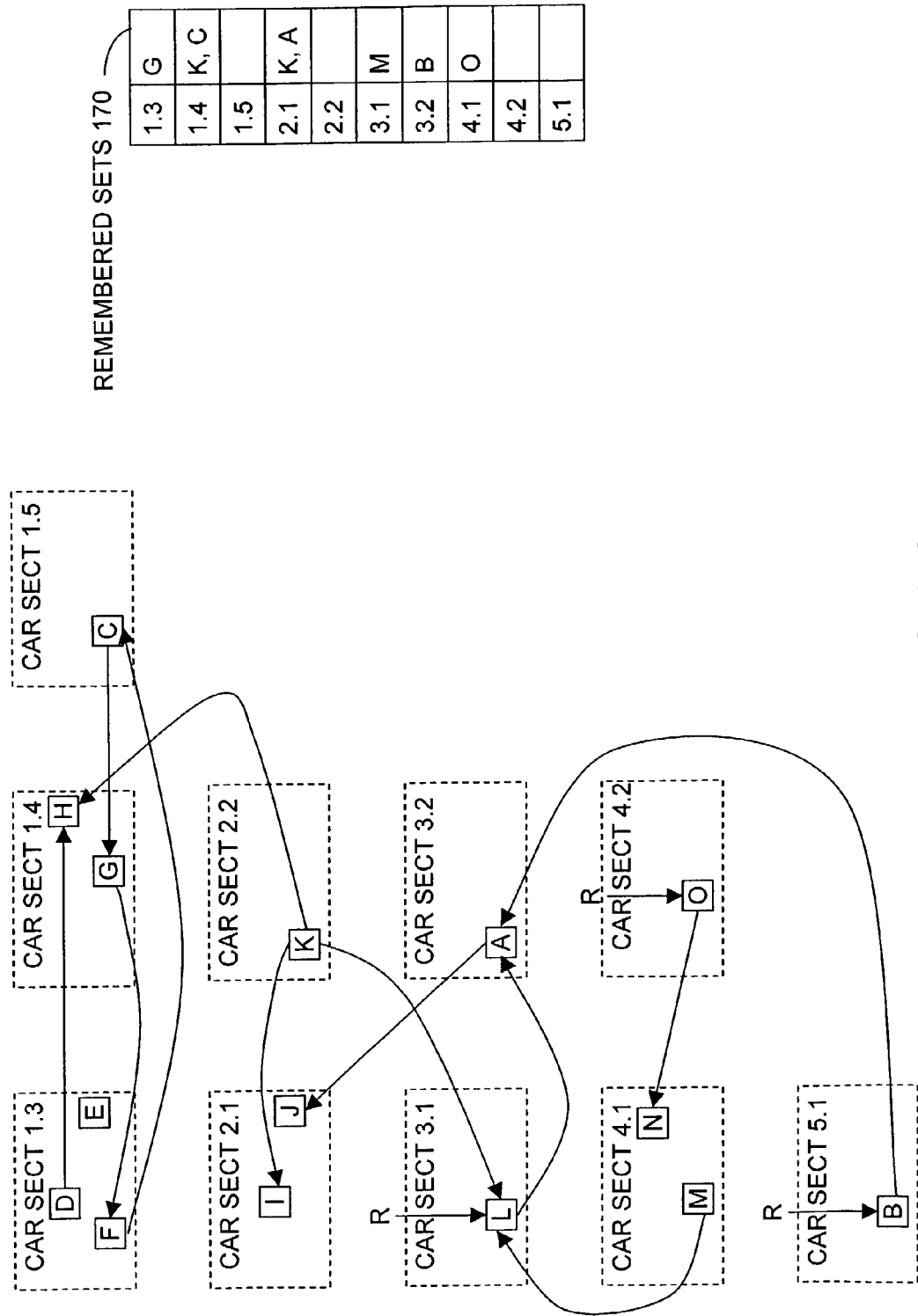
Figure 12D:
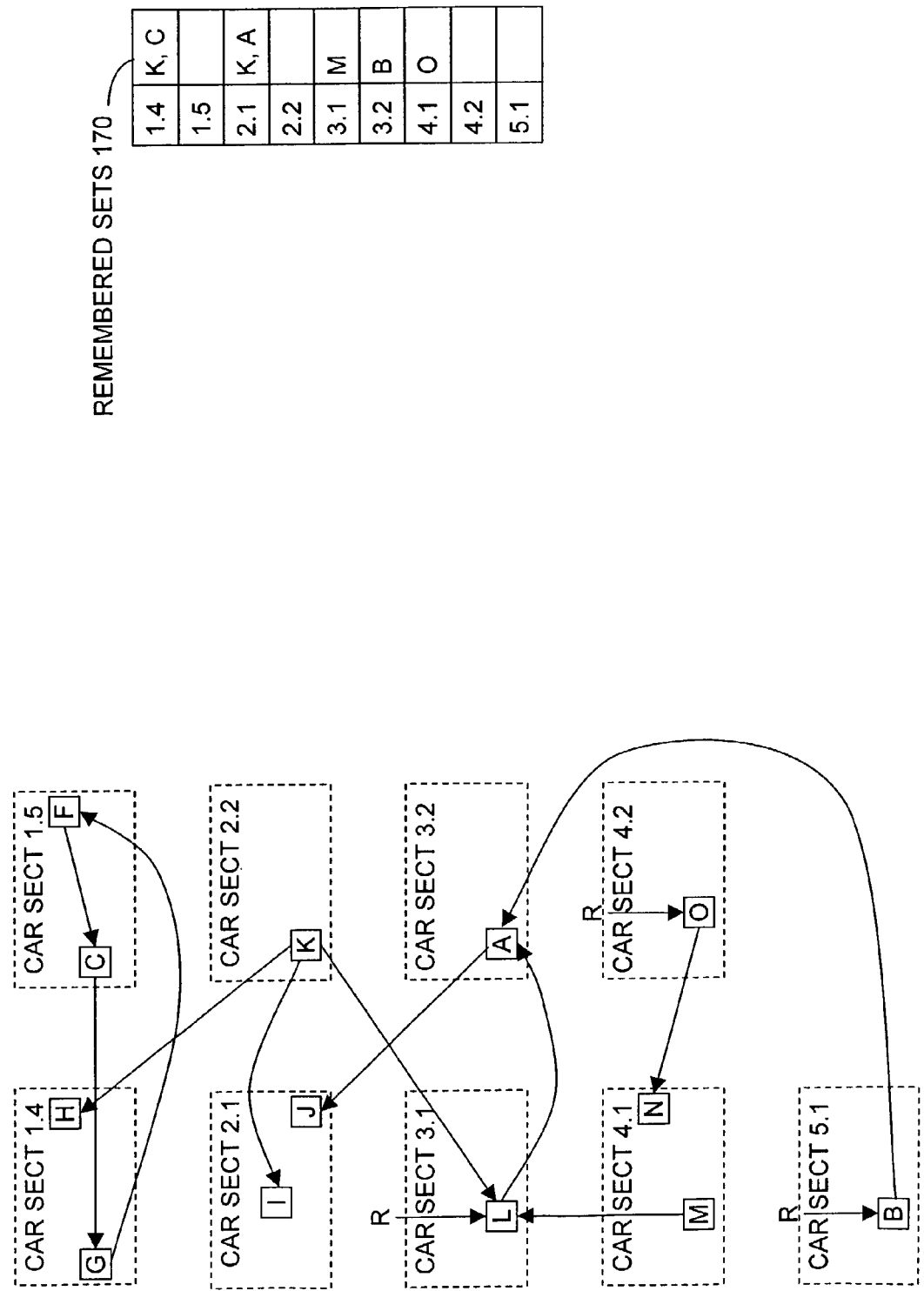
Figure 12E:
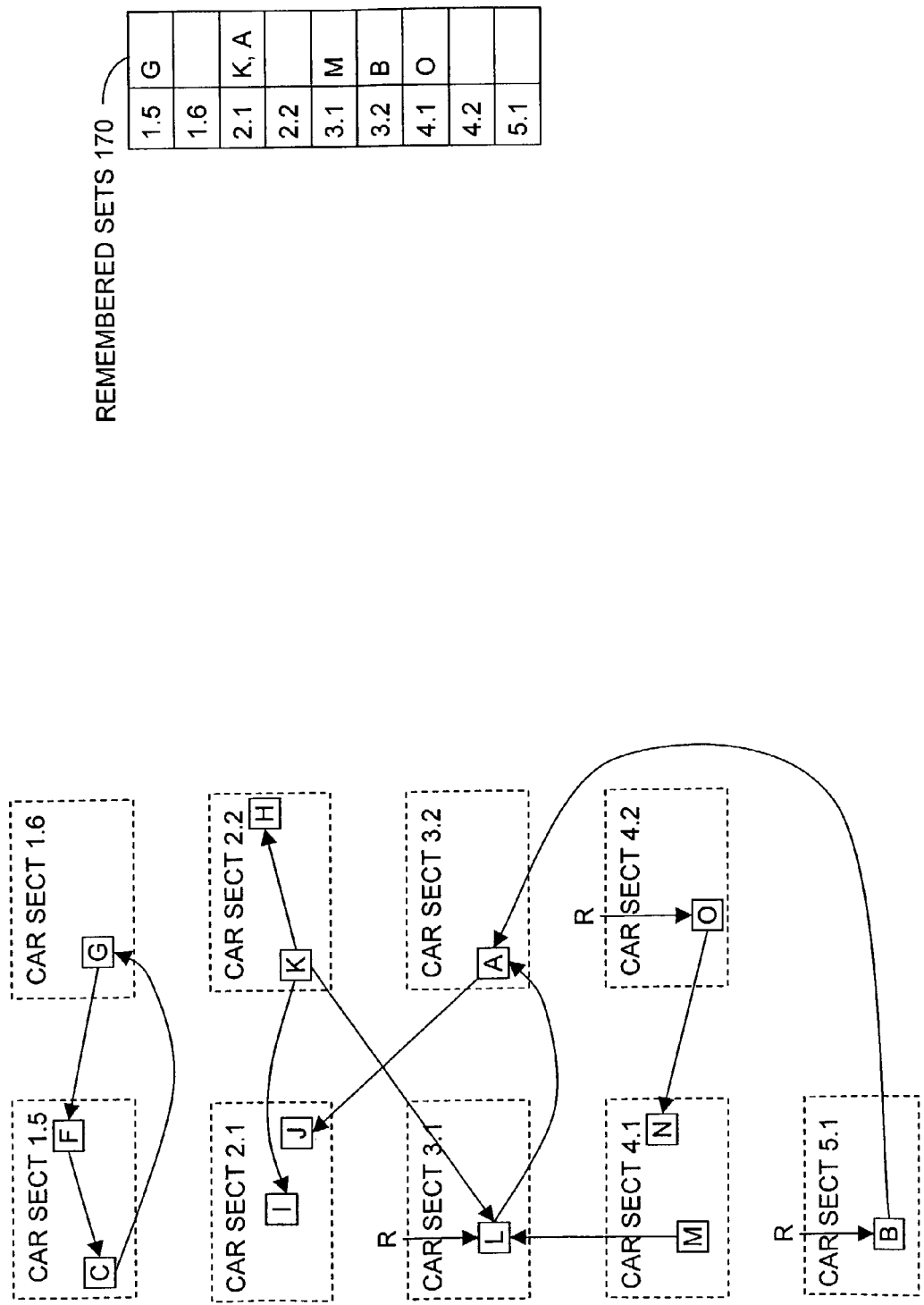
Figure 12F:
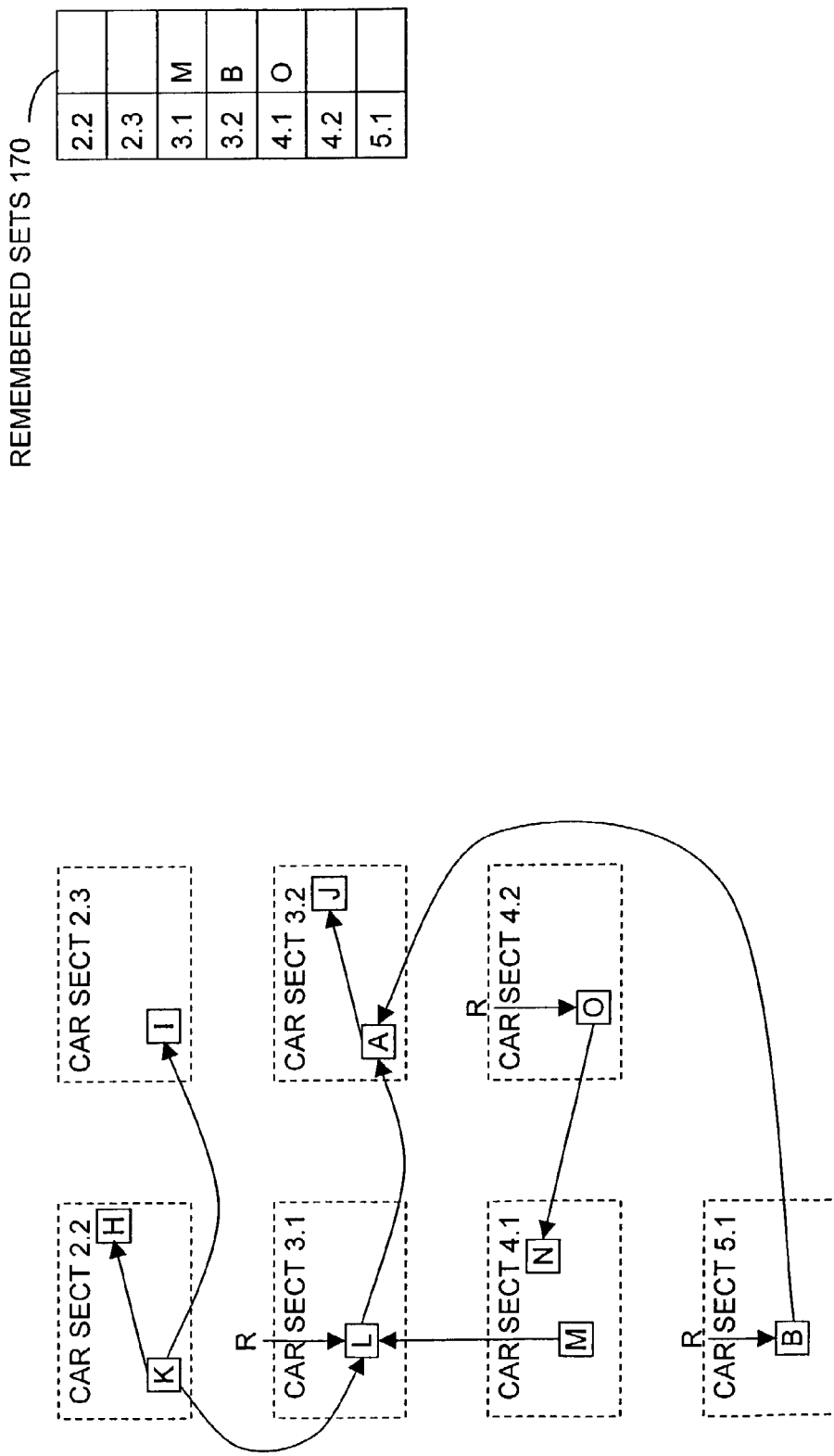
Figure 12I:
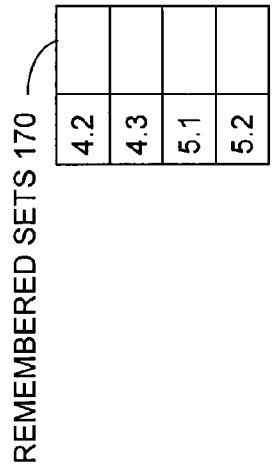
Figure 12I:
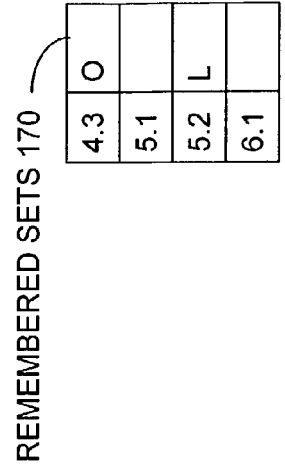
Figure 12I:
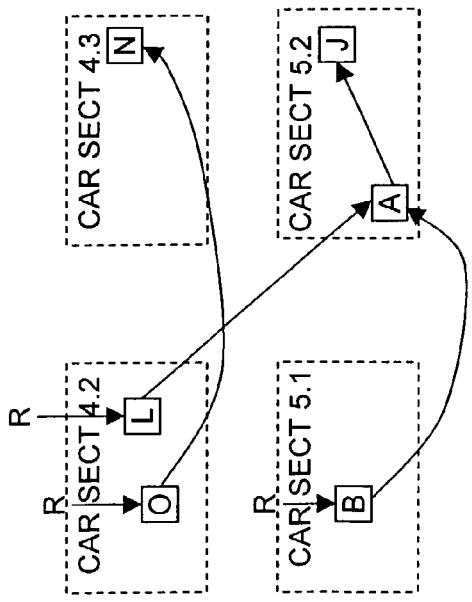
Figure 12J:
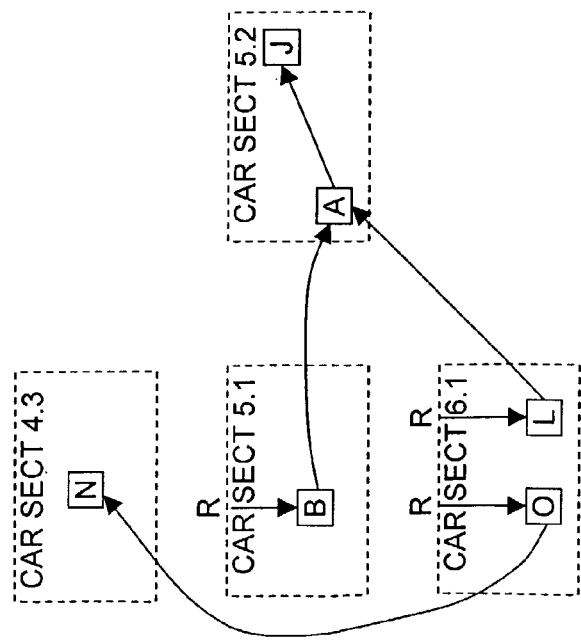

In this operation of scanning references, the collector will typically find not only references to young-generation objects but also some references to old-generation objects. When it does, the illustrated embodiment performs some old-generation-collection tasks in response and thereby avoids some scanning duplication that would otherwise occur during subsequent old-generation collection. Now, in the conventional train-algorithm routine described above in connection with FIG. 8, any old-generation collection-set object referred to by an external reference—i.e., by a reference located outside the old generation—is evacuated during that old-generation collection to a car section belonging to the youngest, external-reference train. Specifically, it is evacuated to a train that is empty at the beginning of the increment and, during that collection increment, is reserved for objects referred to by external references or by references belonging to objects that have been evacuated to that train during the same increment. In contrast, the FIG. 13 embodiment's old-generation collection does not always evacuate externally referred-to collection-set objects to an external-reference train. It does sometimes, though, so the collector prepares for this possibility during the young-generation collection of FIG. 13's block 208. When it finds such an external reference to an old-generation object that is in the collection set, it records that reference's location in a scratch-pad list that it associates with the external-reference train. On the other hand, if the old-generation object to which the external reference thus found refers does not belong to the collection set, the collector will not record that external reference's location in the external-reference train's scratch-pad list. For reasons that will become apparent in due course, though, it marks the referred-to old-generation object's car as one that contains an object referred to directly by an external reference. One way to do this is to make an appropriate entry in a metadata structure maintained for that car, for example.

When the young-generation collection of block 208 has been completed, the collector has performed part of an operation that corresponds to the one described above in connection with FIG. 8A's block 110, which represents a conventional way of processing external references. In that operation, external references to collection-set objects were identified, the collection-set objects to which they referred were evacuated to the external-reference train, and any collection-set objects referred to from the external-reference train were evacuated to it, too. At the end of the young-generation collection represented by FIG. 13A's block 208, part of this has been done: the locations of the external references that refer to collection-set objects have been listed, although any resultant evacuation has been postponed.

The reason for postponing those evacuations is based on my observation that external references tend to be short-lived: they tend either to be call-stack references that quickly go out of scope or to be members of objects that quickly become unreachable. Since the external-reference train in the FIG. 13 embodiment is the youngest train, its car sections will, as in the conventional approach described above, remain uncollected for a relatively long time. So a significant amount of floating garbage would result if all collection-set objects referred to directly or indirectly by typically short-lived external references were evacuated to the external-reference train. As will be seen, the FIG. 13 embodiment reduces this effect by evacuating such collection-set objects to other, older trains if internal references— i.e., references located within the generation—also refer to them. Those older trains' cars will be collected sooner than the external-reference train's will, but most of the external references to these objects will likely have vanished already. Many garbage objects' memory space therefore tends to be reclaimed earlier.

The reason why block 208's young-generation collection includes marking non-collection-set cars that contain objects referred to by external references is to support an operation represented by block 210. Basically, that operation's purpose is to identify dead cars, i.e., cars that meet a criterion that can be satisfied only by a car that contains no reachable objects. The particular criterion used for this purpose is not critical, but example criteria are described in commonly assigned co-pending U.S. patent application Ser. No. 10/313,878 of Alexander T. Garthwaite for Detection of Dead Regions during Incremental Collection, which was filed on the same day as this application and is hereby incorporated by reference.

In the example dead-car-identification approaches described in those applications, remembered-set updating additionally includes updating oldest-car and/or youngest-car indicators for each car. If an entry being made into a given car's remembered set is located in a car older than the one represented by the given car's oldest-car indicator, that oldest-car indicator is updated to identify the car containing the reference for which the new remembered-set entry is being made. So the collector can rely on the fact that no reference located in a car younger than the one identified by the given car's oldest-car indicator refers to any object in the given car. The collector may similarly maintain youngest-car indicators.

In one way of identifying dead cars, any car marked as directly referred to by an external reference is considered potentially alive. And a given car is also marked as potentially alive if its oldest-car indicator is at least as old as some other car that has been marked as potentially alive. By such marking operations or similar ones, the collector can identify all potentially live cars and conclude that any remaining cars are dead. Cars thus identified as dead can be collected inexpensively; their remembered-set entries do not need to be processed, and no objects need to be evacuated from them. So the collector may supplement the provisional collection set by adding a dead car or cars to it to make up the final collection set. Block 210 represents such dead-car identification and collection-set supplementing.

As was mentioned above in connection with the conventional train-algorithm approach described above by reference to FIG. 8, a collector that employs such an approach scans locations represented by collection-set cars' remembered sets in order to find internal references to collection-set objects. When it finds such references, it evacuates the referred-to collection-set objects to the trains from which they were referred. The FIG. 13 embodiment performs similar operations, but in a modified way. First, it does not bother to search the locations represented by entries in the remembered sets of the cars newly added to the collection set because they were identified as dead; all such cars are known to contain only unreachable objects, so there is no need to evacuate any objects from them. Additionally, the evacuation operation is preceded by an operation in which the collector places in reverse train order the references that it found by scanning the locations that the other remembered-set entries identify.

Specifically, the collector builds scratch-pad lists for respective trains by placing in each list entries that tell where references to collection-set objects can be found in the respective train. Again, these lists will identify only locations that contain references to collection-set objects that are not in the collection set's dead cars; they will not contain entries for locations that contain only references to dead-car objects. With the scratch-pad lists thus built, they are accessed in reverse train order to find collection-set objects that should be evacuated to respective trains. The reason for thus processing the references in reverse train order is to reduce the number of subsequent evacuations. If a collection-set object is referred to from, say, both the seventh train and the twentieth train, it is better to evacuate it to the twentieth train rather than to the seventh train, because doing so avoids an evacuation that otherwise would likely be required when the seventh train comes up for collection.

Block 212 represents building those scratch-pad lists, and block 214 represents evacuating the collection-set objects referred to by references whose locations those lists identify. But the evacuation that block 214 represents includes only the evacuations performed in response to entries in the scratch-pad lists built from entries in the collection set's remembered set or sets; it does not include evacuations performed in response to the scratch-pad list corresponding to the external-reference train. Moreover, it does not include evacuations to the oldest train.

To understand the reason for these exceptions, recall that one policy implemented by the FIG. 13 embodiment is that an object referred to both by internal and by external references should be evacuated preferentially to a train in which the internal reference resides rather than to the external-reference train. This is the reason for initially excluding evacuations to the external-reference train; when the external-reference train's scratch-pad list is thereafter processed, only collection-set objects that have not already been evacuated to other trains from which they are referred end up being evacuated to the external-reference train. And the reason for initially excluding evacuations to the oldest train is that the collector additionally implements another policy, which is that a collection-set object should be evacuated to the oldest train only if it is referred to by no reference outside that train. This policy's purpose is to help insure progress in collecting the oldest train. Unless an object is referred to by no references outside the oldest train, adding that object to the oldest train will tend to retard that train's collection. As was just mentioned, therefore, the operations represented by block 214 include evacuating objects in response to entries in the scratch-pad lists associated with all trains but the external-reference train and the oldest train. And blocks 216 and 218 respectively represent thereafter after evacuating collection-set objects in response to the external-reference train's and then the oldest train's scratch-pad lists.

As block 220 and 222 indicate, the collection set is then reclaimed and mutator execution resumes.

Note that performing the reference-locating operations both for internal and for external references before objects are evacuated in response to either operation enables the illustrated collector to do a couple of things that reduce collection cost. By locating the internal references before evacuation is performed in response to the located external references, the collector can evacuate some externally referred-to objects in response to internal references and thereby reduce the amount of floating garbage. At the same time, locating external references before evacuation is performed in response internal references enables the collector to identify dead cars and thereby reduce the amount of remembered-set processing and collection-set-object evacuation.

Mixing internal- and external-reference processing can yield advantages in other embodiments, too. FIG. 14 is a flow chart that depicts a collection increment performed by another such embodiment. In that drawing, reference numerals 226, 228, 230, and 232 refer to elements essentially the same as those identified in FIG. 13 by reference numerals 200, 202, 204, and 206, respectively. But the embodiment that FIG. 14 illustrates employs a different policy for its evacuation of collection-set objects referred-to by external references. As was mentioned above, external references tend to be short-lived. For this reason, the embodiment of FIG. 13 avoids evacuating an externally referred-to object to the external-reference train if that object is also referred to by an internal reference. This keeps the likely short-lived object from being placed into the external-reference train, which in that embodiment is the youngest and the one in which the object is likely to reside longest as garbage. The embodiment of FIG. 14, too, implements a policy that deals with lack of external-reference longevity. But it does so in a different way.

To understand the FIG. 14 approach, recall that a train-algorithm-based collector maintains an order among the trains and that a train's relative position within that order is referred to—loosely, as we shall see—in terms of "age": a train that is scheduled to be collected sooner than another been referred to as "older" than the other train. This terminology results from the fact that chronologically older trains do tend to be collected before trains that have been created more recently.

But some train-algorithm embodiments may advance more-recently created trains ahead of some earlier-created trains, so an "older" train may sometimes be chronologically younger. This advancing of trains ahead of their chronological ages is what the FIG. 14 embodiment does in the case of external-reference trains: in a given collection increment, it may newly create an external-reference train but place it in the collection order ahead of other, chronologically older trains. It may, for instance, place it ahead of every train but the oldest.

The purpose for thus making external-reference trains older is to respond to the fact that external references tend to be short-lived and that the external-reference train's contents are therefore likely soon to become mostly garbage and thus ripe for collection. But not all externally reachable objects will soon be garbage, and factors such as the age of the reference or the referred-to object give some indication of the referred-to object's tendency to become garbage soon; older objects tend to remain reachable longer and therefore should be put in younger trains. The FIG. 14 embodiment therefore typically provides more than one new, external-reference train during each increment, giving each a different "age", i.e., placing each in a different position within the train order. (Because of progress requirements, though, all are made younger than the oldest train.) As the collector locates external references to collection-set objects, it places an entry for each into a scratch-pad list associated with one of the external-reference trains, the choice among the trains being made in accordance with some measure of age, such as the age of the reference or the age of the object to which the reference refers. Various approaches to assigning age for this purpose are described in commonly assigned co-pending U.S. Patent Application Ser. No. 10/313,657 of Alex T. Garthwaite for Better Placement of Objects Reachable from Outside a Generation Managed by the Train Algorithm, which was filed on the same date as this application and is hereby incorporated by reference.

So, while block 234 represents an operation similar to the one described in connection with FIG. 13's block 208, the embodiment that FIG. 14 illustrates will typically build multiple lists of external references to objects in the provisional collection set, each list being associated with a different one of the external-reference trains, which are given different seniority within the train set in accordance with the relative ages of the references or the referred-to objects.

Block 240 represents thereafter evacuating collection-set objects in response to the entries in the scratch-pad lists, including the lists that are associated with the external-reference trains. The lists associated with those trains are processed in their order among the lists associated with other trains, and none of the external-reference trains has been accorded a seniority greater than the oldest train's. So processing the list in reverse train order will naturally comply with the requirement that the oldest train's list be processed last and that the only objects evacuated to the oldest train will be those referred to by references in no other trains.

As blocks 242 and 244 indicate, the collection set is then reclaimed and mutator execution resumes.

Figure 15A:
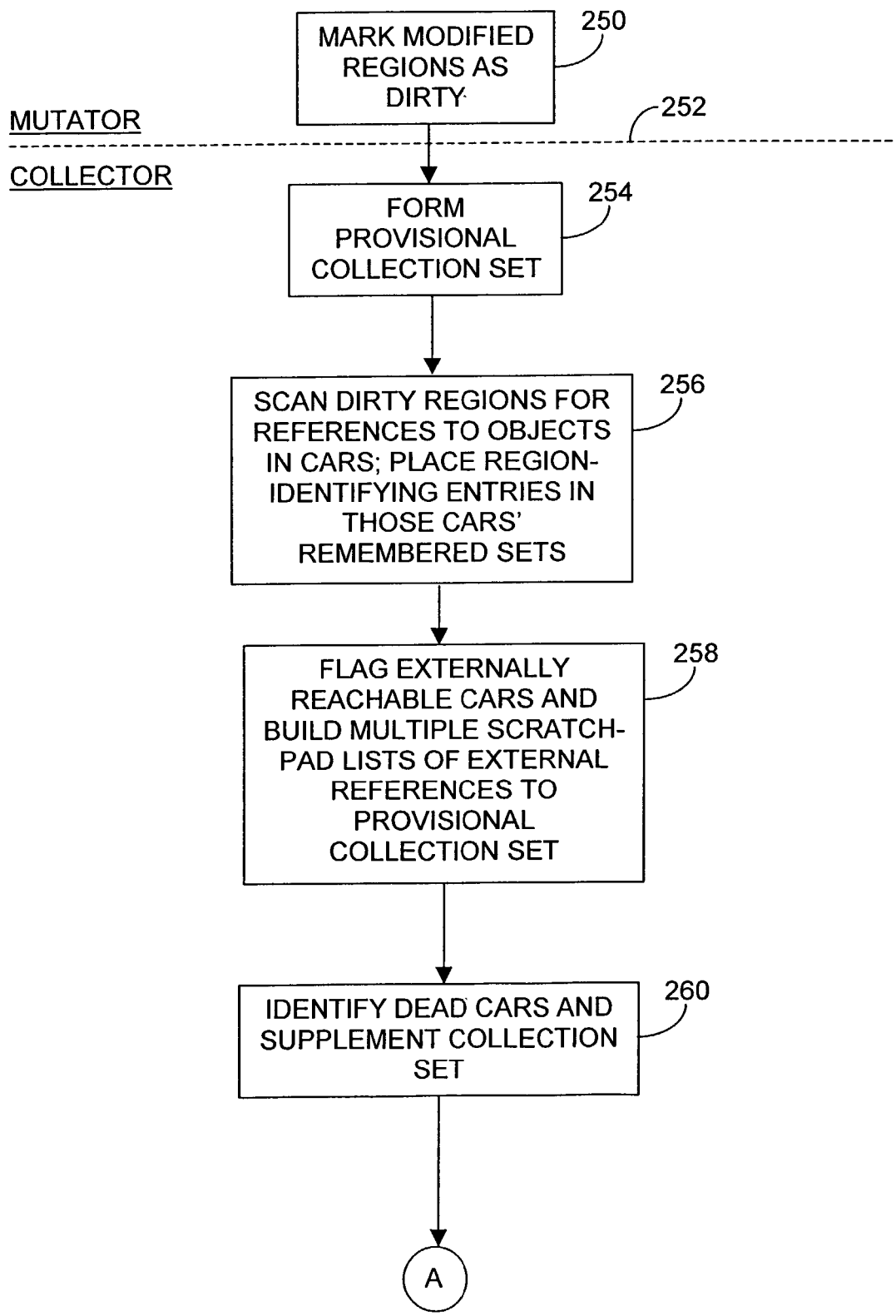
FIGS. 15A and 15B together form a flow chart that illustrates a collection increment executed by a third embodiment of the present invention.
Figure 15B:
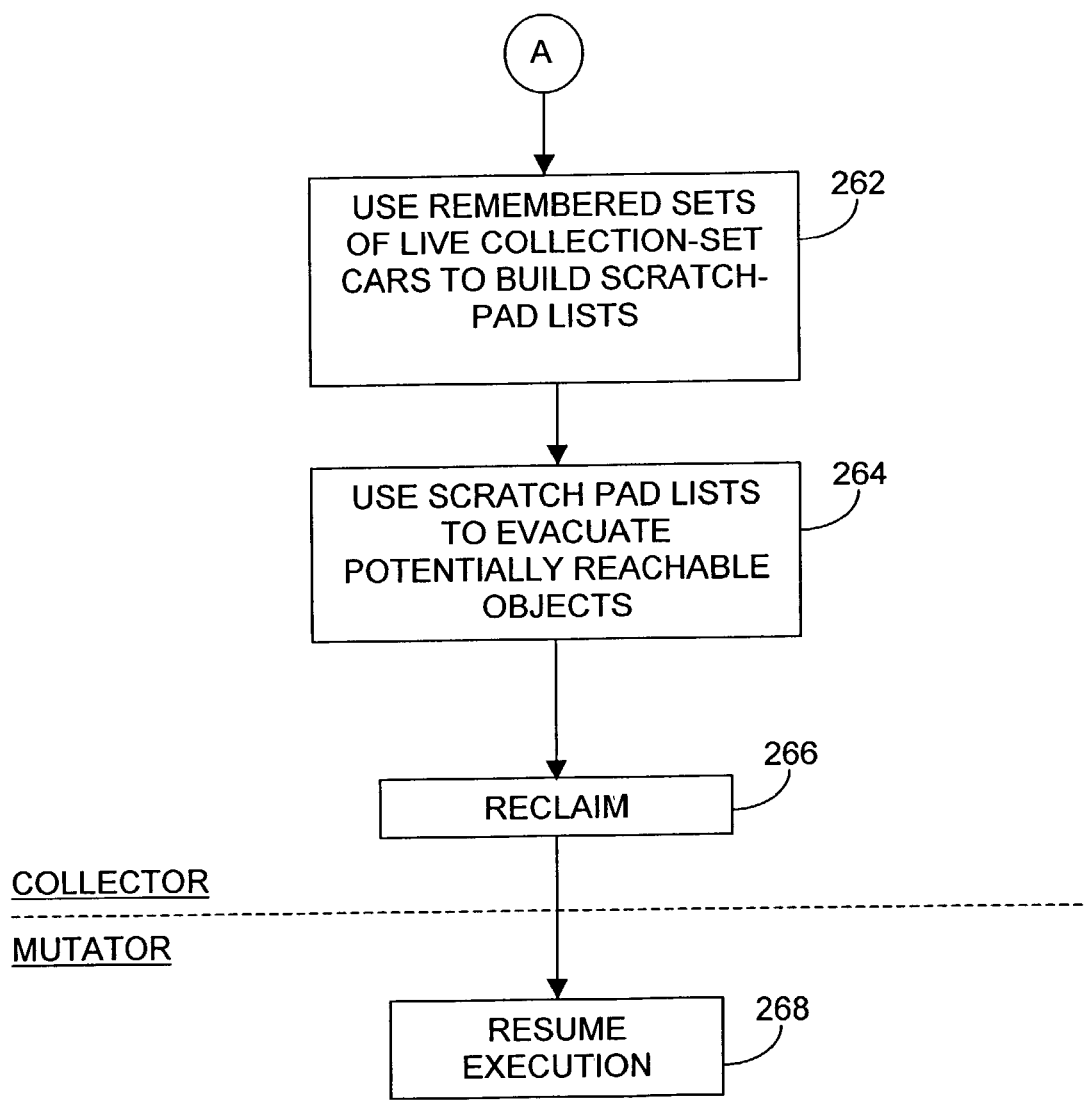

Although most train-algorithm implementations employ two generations, not all do. FIGS. 15A and 15B (together, "FIG. 15") depict an increment executed by a single-generation collector that employs the train algorithm to manage that single generation. Reference numerals 250, 252, 254, and 256 refer to elements similar to those respectively referred to by FIG. 13's reference numerals 200, 202, 204, and 206. The operations of FIG. 15's block 258 are similar to those represented by FIG. 13's block 208, except that no young-generation collection occurs; and, since there is no generation other than the single, train-algorithm-managed generation, all external references are located in the basic root set. With these differences, FIG. 15's block 258 represents flagging externally reachable cars as before and making lists of the locations of external references to objects in the provisional collection set. As the FIG. 14 embodiment does, that of FIG. 15 employs multiple external-reference trains, positioning and populating them according to object or reference age. The remainder of the operations, which blocks 260, 262, 264, 266, and 268 represent, are essentially the same as those described in connection with corresponding blocks in FIG. 14.

By combining the processing of internal and external references, collectors that practice the present invention's teachings can reduce garbage-collection expense. The present invention therefore constitutes a significant advance in the art.

The invention claimed is:

1. For operating a computer system, which includes memory, as a garbage collector that treats at least a generation of a garbage-collected heap in the memory as divided into sections and collects the generation in collection increments with which the garbage collector associates respective collection sets in the generation, a method comprising, in at least some of the collection increments:
   A) finding references, denominated external references, that are located outside the generation but refer to objects that are located inside the generation, listing the external references thereby found that refer to objects in the collection set, and marking sections of the generation that contain objects to which the external references thereby found refer;
   B) identifying and including in the collection set at least one section, denominated a dead section, not reachable through a reference chain that includes an external reference thereby found;
   C) finding references, denominated internal references, that are located inside the generation but outside the collection set and refer to objects that are located inside the collection set;
   D) evacuating from the collection set objects reachable from outside the collection set without evacuating therefrom any object located in a dead section even if that dead section contains an object referred to by an internal reference; and
   E) reclaiming the collection set.

2. A method as defined in claim 1 wherein:
   A) the method further includes maintaining for each of at least some of the sections a respective remembered set, associated therewith, of locations in the generation where references have been found to an objects in the associated section; and
   B) in at least some of the collection increments:
      i) the remembered set associated with a dead section included in the collection set lists at least one location in that dead section at which a reference to an object in the collection set has been found; and
      ii) the step of finding internal references to objects in the collection set includes, without scanning locations listed in any remembered set associated with a dead section, scanning the locations listed in every other remembered set associated with a section that contains an object in the collection set.

3. A computer system comprising:
   A) processor circuitry operable to execute processor instructions; and
   B) memory circuitry, to which the processor circuitry is responsive, that contains processor instructions readable by the processor circuitry to configure the computer system to operate as a garbage collector that:
      i) treats at least a generation of a garbage-collected heap in the memory as divided into sections; and
      ii) collects the generation in collection increments with which the garbage collector associates respective collection sets in the generation and in at least some of which the garbage collector:
         a) finds references, denominated external references, that are located outside the generation but refer to objects that are located inside the generation
         b) lists the external references thereby found that refer to objects in the collection set;
         c) marks sections of the generation that contain objects to which the external references thereby found refer;
         d) identifies and includes in the collection set at least one section, denominated a dead section, not reachable through a reference chain that includes an external reference thereby found;
         e) finds references, denominated internal references, that are located inside the generation but outside the collection set and refer to objects that are located inside the collection set;
         f) evacuates from the collection set objects reachable from outside the collection set without evacuating therefrom any object located in a dead section even if that dead section contains an object referred to by an internal reference; and
      iii) reclaims the collection set.

4. A computer system as defined in claim 3 wherein:
   A) the garbage collector maintains for each of at least some of the sections a respective remembered set, associated therewith, of locations in the generation where references have been found to an objects in the associated section; and
   B) in at least some of the collection increments:
      i) the remembered set associated with a dead section included in the collection set lists at least one location in that dead section at which a reference to an object in the collection set has been found; and
      ii) when the garbage collector finds the internal references to objects in the collection set in an operation, the garbage collector does so by, without scanning locations listed in any remembered set associated with a dead section, scanning the locations listed in every other remembered set associated with a section that contains an object in the collection set.

5. A storage medium containing instructions readable by a computer system that includes memory to configure the computer system to operate as a garbage collector that:
   A) treats at least a generation of a garbage-collected heap in the memory as divided into sections; and
   B) collects the generation in collection increments with which the garbage collector associates respective collection sets in the generation and in at least some of which the garbage collector:
      i) finds references, denominated external references, that are located outside the generation but refer to objects that are located inside the generation
      ii) lists the external references thereby found that refer to objects in the collection set;
      iii) marks sections of the generation that contain objects to which the external references thereby found refer;
      iv) identifies and includes in the collection set at least one section, denominated a dead section, not reachable through a reference chain that includes an external reference thereby found;
      v) finds references, denominated internal references, that are located inside the generation but outside the collection set and refer to objects that are located inside the collection set;
      vi) evacuates from the collection set objects reachable from outside the collection set without evacuating therefrom any object located in a dead section even if that dead section contains an object referred to by an internal reference; and
      vii) reclaims the collection set.

6. A storage medium as defined in claim 5 wherein: A) the garbage collector maintains for each of at least some of the sections a respective remembered set, associated therewith, of locations in the generation where references have been found to an objects in the associated section; and B) in at least some of the collection increments: i) the remembered set associated with a dead section included in the collection set lists at least one location in that dead section at which a reference to an object in the collection set has been found; and ii) when the garbage collector finds the internal references to objects in the collection set in an operation, the garbage collector does so by, without scanning locations listed in any remembered set associated with a dead section, scanning the locations listed in every other remembered set associated with a section that contains an object in the collection set.

7. For collecting at least a generation of a garbage-collected heap in a computer system's memory in collection increments with which each of which a garbage collector associates a respective collection set in the generation, the garbage collector comprising:
  A) means for treating the generation as divided into sections;
  B) means for finding references, denominated external references, that are located outside the generation but refer to objects that are located inside the generation
  C) means for listing the external references thereby found that refer to objects in the collection set;
  D) means for marking sections of the generation that contain objects to which the external references thereby found refer;
  E) means for identifying and including in the collection set at least one section, denominated a dead section, not reachable through a reference chain that includes an external reference thereby found;
  F) means for finding references, denominated internal references, that are located inside the generation but outside the collection set and refer to objects that are located inside the collection set;
  G) means for evacuating from the collection set objects reachable from outside the collection set without evacuating therefrom any object located in a dead section even if that dead section contains an object referred to by an internal reference; and
  H) means for reclaiming the collection set.

8. For operating a computer system, which includes memory, as a garbage collector that treats at least a generation of a garbage-collected heap in the memory as divided into car sections grouped into trains and collects the generation in accordance with the train algorithm in collection increments with which the garbage collector associates respective collection sets in the generation, a method comprising, in each of at least some of the collection increments:
  A) finding references, denominated external references, that are located outside the generation but refer to objects that are located inside the generation;
  B) finding references, denominated internal references, that are located inside the generation but outside the collection set and refer to objects that are located inside the collection set;
  C) evacuating potentially reachable objects from the collection set in operations that include:
    i) in response to at least one said external reference that refers to an object in the collection set, evacuating that object to a car section belonging to a train, denominated an external-reference train, that is empty at the beginning of that collection increment; and
    ii) in response to at least one internal reference that refers to an object in the collection set also referred to by at least one external reference, evacuating that object to a car section in the train to which the car containing that internal reference belongs; and
  D) reclaiming the collection set.

9. A computer system comprising:
  A) processor circuitry operable to execute processor instructions; and
  B) memory circuitry, to which the processor circuitry is responsive, that contains processor instructions readable by the processor circuitry to configure the computer system to operate as a garbage collector that:
    i) treats at least a generation of a garbage-collected heap in the memory as divided into car sections grouped into trains; and
    ii) collects the generation in accordance with the train algorithm in collection increments with which the garbage collector associates respective collection sets in the generation and in at least some of which the garbage collector:
      a) finds references, denominated external references, that are located outside the generation but refer to objects that are located inside the generation;
      b) finds references, denominated internal references, that are located inside the generation but outside the collection set and refer to objects that are located inside the collection set;
      c) evacuates potentially reachable objects from the collection set in operations that include:
        (1) in response to at least one said external reference that refers to an object in the collection set, evacuating that object to a car section belonging to a train, denominated an external-reference train, that is empty at the beginning of that collection increment; and
        (2) in response to at least one internal reference that refers to an object in the collection set also referred to by at least one external reference, evacuating that object to a car section in the train to which the car containing that internal reference belongs; and
      d) reclaims the collection set.

10. A storage medium containing instructions readable by a computer system that includes memory to configure the computer system to operate as a garbage collector that:
  A) treats at least a generation of a garbage-collected heap in the memory as divided into car sections grouped into trains; and
  B) collects the generation in accordance with the train algorithm in collection increments with which the garbage collector associates respective collection sets in the generation and in at least some of which the garbage collector:
    i) finds references, denominated external references, that are located outside the generation but refer to objects that are located inside the generation;
    ii) finds references, denominated internal references, that are located inside the generation but outside the collection set and refer to objects that are located inside the collection set;
    iii) evacuates potentially reachable objects from the collection set in operations that include:
      a) in response to at least one said external reference that refers to an object in the collection set, evacuating that object to a car section belonging to a train, denominated an external-reference train, that is empty at the beginning of that collection increment; and b) in response to at least one internal reference that refers to an object in the collection set also referred to by at least one external reference, evacuating that object to a car section in the train to which the car containing that internal reference belongs; and iv) reclaims the collection set.

11. For collecting at least a generation of a garbage collected heap in a computer system's memory in accordance with the train algorithm in collection increments with which each of which a garbage collector associates a respective collection set in the generation, the garbage collector comprising:

A) means for treating the generation as divided into car sections grouped into trains; and B) means for finds references, denominated external references, that are located outside the generation but refer to objects that are located inside the generation;

C) means for finding references, denominated internal references, that are located inside the generation but outside the collection set and refer to objects that are located inside the collection set;

D) means for evacuating potentially reachable objects from the collection set in operations that include:

i) in response to at least one said external reference that refers to an object in the collection set, evacuating that object to a car section belonging to a train, denominated an external-reference train, that is empty at the beginning of that collection increment; and ii) in response to at least one internal reference that refers to an object in the collection set also referred to by at least one external reference, evacuating that object to a car section in the train to which the car containing that internal reference belongs; and E) means for reclaiming the collection set.

12. In the method of operating a computer system, which includes memory, as a garbage collector that collects at least a generation of a garbage-collected heap in the memory in collection increments with which the garbage collector associates respective collection sets in the generation and in at least some of which the garbage collector locates references, denominated external references, that are located outside the generation but refer to objects in the collection set, locates references, denominated internal references, that are located inside the generation but outside the collection set and refer to objects that are inside the collection set, evacuates from the collection set objects referred to by references thereby found, and reclaims the collection set, the improvement wherein, in at least some collection increments, the garbage collector locates both the internal and the external references before any object is evacuated from the collection set in response to references thereby located.

13. A computer system comprising including memory that:

A) processor circuitry operable to execute processor instructions; and

B) memory circuitry, to which the processor circuitry is responsive, that contains processor instructions readable by the processor circuitry to configure the computer system to operate as a garbage collector that collects at least a generation of a garbage-collected heap in the memory in collection increments with which the garbage collector associates respective collection sets in the generation and in at least some of which the garbage collector:

i) locates references, denominated external references, that are located outside the generation but refer to objects in the collection set;

ii) locates references, denominated internal references, that are located inside the generation but outside the collection set and refer to objects that are inside the collection set;

iii) evacuates from the collection set objects referred to by references thereby found, each such collection-set object being evacuated only after the garbage collector has located both the external and the external references; and iv) reclaims the collection set.

14. A storage medium containing instructions readable by a computer system that includes memory to configure the computer system to operate as a garbage collector that collects at least a generation of a garbage-collected heap in the memory in collection increments with which the garbage collector associates respective collection sets in the generation and in at least some of which the garbage collector:

A) locates references, denominated external references, that are located outside the generation but refer to objects in the collection set;

B) locates references, denominated internal references, that are located inside the generation but outside the collection set and refer to objects that are inside the collection set;

C) evacuates from the collection set objects referred to by references thereby found, each such collection-set object being evacuated only after the garbage collector has located both the external and the external references; and D) reclaims the collection set.

15. For collecting at least a generation of a garbage-collected heap in a computer system's memory in collection increments with each of which a garbage collector associates respective collection set in the generation, the garbage collector comprising:

A) means for locating references, denominated external references, that are located outside the generation but refer to objects in the collection set;

B) means for locating references, denominated internal references, that are located inside the generation but outside the collection set and refer to objects that are inside the collection set;

C) means for evacuating from the collection set objects referred to by references thereby found, each such collection-set object being evacuated only after the garbage collector has located both the external and the external references; and D) means for reclaiming the collection set.

* * * * *